(12) United States Patent
Knittel et al.

(10) Patent No.: US 6,512,517 B1
(45) Date of Patent: Jan. 28, 2003

(54) VOLUME RENDERING INTEGRATED CIRCUIT

(75) Inventors: James M. Knittel, Groton, MA (US); Stephen R. Burgess, Medfield, MA (US); Kenneth W. Correll, Lancaster, MA (US); Jan C. Hardenbergh, Sudbury, MA (US); Christopher J. Kappler, Charlestown, MA (US); Hugh C. Lauer, Concord, MA (US); Stephen F. Mason, Roanoke, VA (US); Takahide Ohkami, Newton, MA (US); William R. Peet, Billerica, MA (US); Hanspeter Pfister, Somerville, MA (US); Beverly J. Schultz, Ayer, MA (US); Jay C. Wilkinson, Newton, MA (US)

(73) Assignee: TeraRecon, Inc., San Mateo, CA (US)

( * ) Notice: Subject to any disclaimer, the term of this patent is extended or adjusted under 35 U.S.C. 154(b) by 0 days.

(21) Appl. No.: 09/315,742

(22) Filed: May 20, 1999

Related U.S. Application Data

(63) Continuation-in-part of application No. 09/190,643, filed on Nov. 12, 1998.

(51) Int. Cl.[7] ............................................. G06T 17/00
(52) U.S. Cl. .................................................. 345/424
(58) Field of Search ................................ 345/418, 419, 345/420, 421, 422, 423, 424

(56) References Cited

U.S. PATENT DOCUMENTS

| 5,201,035 | A | 4/1993 | Stytz et al. ................. 395/163 |
| 5,381,518 | A | 1/1995 | Drebin et al. ................ 395/124 |
| 5,467,459 | A | 11/1995 | Alexander et al. .......... 395/480 |
| 5,594,842 | A | 1/1997 | Kaufman et al. ........... 395/124 |
| 5,644,689 | A | 7/1997 | Ban et al. .................... 395/124 |
| 6,243,098 | B1 * | 6/2001 | Lauer et al. ................ 345/424 |

OTHER PUBLICATIONS

A. Mammen; "Transparency and Antialiasing Algorithms Implemented with the Virtual Pixel Maps Technique"; IEEE Computer Graphic & Applications, Jul., 1989; pp. 43–55.

J. Lichtermann; "Design of a Fast Voxel Processor for Parallel Volume Visualization"; pp. 83–92.

R. Drebin et al.; "Volume Rendering"; *Computer Graphics*, vol. 22 No. 4, Aug., 1988; pp. 65–74.

D. Voorhies et al.; "Virtual Graphics"; *Computer Graphics*, vol. 22 No. 4, Aug., 1988; pp. 247–253.

* cited by examiner

*Primary Examiner*—Cliff N. Vo
(74) *Attorney, Agent, or Firm*—Dirk Brinkman

(57) ABSTRACT

A volume rendering integrated circuit includes a plurality of interconnected pipelines having stages operating in parallel. The stages of the pipelines are interconnected in a ring, with data being passed in only one direction around the ring. The volume integrated circuit also includes a render controller for controlling the flow of volume data to and from the pipelines and for controlling rendering operations of the pipelines. The integrated circuit may further include interfaces for coupling the integrated circuit to various storage devices and to a host computer.

22 Claims, 18 Drawing Sheets

650

| Address | Name | Module | Description |
|---|---|---|---|
| Rendering Command Register ||||
| x'120' | RENDER_COMMAND | CmdSequencer RpShader[b] ReCompos | Render Command Register |
| Object Size and Object Address Parameter Registers ||||
| x'1008' | RENDER_OBJECT_BASE | VxIf | Render Object Base |
| x'1444' | RENDER_OBJECT_SIZE | VxIf PxIf | Render Object Size Register |
| x'100C' | RENDER_OBJECT_OFFSET | VxIf | Render Object Offset Register |
| x'1848' | RENDER_OBJECT_SUBVOLUME_SIZE | VxIf ReCompos | Render Object Subvolume Size Register |
| Cut Plane Parameter Registers ||||
| x'800' | CUT_PLANE_X | ReCompos | Cut Plane X |
| x'804' | CUT_PLANE_Y | ReCompos | Cut Plane Y |
| x'808' | CUT_PLANE_Z | ReCompos | Cut Plane Z |
| x'80C' | CUT_PLANE_INITIAL | ReCompos | Cut Plane Initial |
| x'810' | CUT_PLANE_FALLOFF | ReCompos | Cut Plane Falloff |
| x'814' | CUT_PLANE_DMAX | ReCompos | Cut Plane Distance Max |
| x'818' | CUT_PLANE_DMIN | ReCompos | Cut Plane Distance Min |
| x'81C' | CROPPING_INFO_A | ReCompos | Cropping Information A Register |
| x'820' | CROPPING_INFO_B | ReCompos | Cropping Information B Register |

652 → Rendering Command Register row
654 → Object Size and Object Address Parameter Registers rows
656 → Cut Plane Parameter Registers rows

*FIG. 16*

VOLUME RENDERING INTEGRATED CIRCUIT

CROSS REFERENCE TO RELATED APPLICATIONS

This application is a continuation in part of U.S. patent application Ser. No. 09/190,634 "Fast Storage and Retrieval of Intermediate Values in a Real-Time Volume Rendering System," filed on Nov. 12, 1998.

FIELD OF THE INVENTION

The present invention is related to the field of computer graphics, and in particular to rendering volumetric data sets using hardware pipelines.

BACKGROUND OF THE INVENTION

Volume graphics is the subfield of computer graphics that deals with the visualization of objects or phenomena represented as sampled data in three or more dimensions. These samples are called volume elements, or "voxels," and contain digital information representing physical characteristics of the objects or phenomena being studied. For example, voxel values for a particular object or system may represent density, type of material, temperature, velocity, or some other property at discrete points in space throughout the interior and in the vicinity of that object or system.

Volume rendering is the part of volume graphics concerned with the projection of volume data as two-dimensional images for purposes of printing, display on computer terminals, and other forms of visualization. By assigning colors and transparency to particular voxel data values, different views of the exterior and interior of an object or system can be displayed. For example, a surgeon needing to examine the ligaments, tendons, and bones of a human knee in preparation for surgery can utilize a tomographic scan of the knee and cause voxel data values corresponding to blood, skin, and muscle to appear to be completely transparent. The resulting image then reveals the condition of the ligaments, tendons, bones, etc. which are hidden from view prior to surgery, thereby allowing for better surgical planning, shorter surgical operations, less surgical exploration and faster recoveries. In another example, a mechanic using a tomographic scan of a turbine blade or welded joint in a jet engine can cause voxel data values representing solid metal to appear to be transparent while causing those representing air to be opaque. This allows the viewing of internal flaws in the metal that would otherwise be hidden from the human eye.

Real-time volume rendering is the projection and display of volume data as a series of images in rapid succession, typically at 30 frames per second or faster. This makes it possible to create the appearance of moving pictures of the object, phenomenon, or system of interest. It also enables a human operator to interactively control the parameters of the projection and to manipulate the image, thus providing the user with immediate visual feedback. It will be appreciated that projecting tens of millions or hundreds of millions of voxel values to an image requires enormous amounts of computing power. Doing so in real time requires substantially more computational power.

Additional general background on volume rendering is presented in a book entitled "Introduction to Volume Rendering" by Barthold Lichtenbelt, Randy Crane, and Shaz Naqvi, published in 1998 by Prentice Hall PTR of Upper Saddle River, N.J. Further background on volume rendering architectures is found in a paper entitled "Towards a Scalable Architecture for Real-time Volume Rendering" presented by H. Pfister, A. Kaufman, and T. Wessels at the 10th Eurographics Workshop on Graphics Hardware at Masstricht, The Netherlands, on Aug. 28 and 29, 1995. This paper describes an architecture now known as "Cube 4." The Cube 4 is also described in a Doctoral Dissertation entitled "Architectures for Real-Time Volume Rendering" submitted by Hanspeter Pfister to the Department of Computer Science at the State University of New York at Stony Brook in December 1996, and in U.S. Pat. No. 5,594,842, "Apparatus and Method for Real-time Volume Visualization."

Cube 4 and other architectures achieve real-time volume rendering using the technique of parallel processing. A plurality of processing elements are deployed to concurrently perform volume rendering operations on different portions of a volume data set, so that the overall time required to render the volume is reduced in substantial proportion to the number of processing elements. In addition to requiring a plurality of processing elements, parallel processing of volume data requires a high-speed interface between the processing elements and a memory storing the volume data, so that the voxels can be retrieved from the memory and supplied to the processing elements at a sufficiently high data rate to enable the real-time rendering to be achieved.

Volume rendering as performed by Cube 4 is an example of a technique known as "ray-casting." A large number of rays are passed through a volume in parallel and processed by evaluating the volume data a slice at a time, where a "slice" is a planar set, of voxels parallel to a face of the volume data set. Using fast slice-processing technique in specialized hardware, as opposed to software, frame processing rates can be increased to be higher than two frames per second.

The essence of the Cube-4 system is that the three dimensional sampled data representing the object is distributed across the memory modules by a technique called "skewing," so that adjacent voxels in each dimension are stored in adjacent memory modules independent of view direction. Each memory module is dedicated to its own processing pipeline. Moreover, voxels are organized in the memory modules so that if there are a total of P pipelines and P memory modules, then P adjacent voxels can be fetched in parallel within a single clock cycle of a computer memory system, independent of the view direction. This reduces the total time to fetch voxels from memory by a factor of P. For example, if the data set has $256^3$ voxels and P has the value four, then only $256^3/4$ or approximately four million memory cycles are needed to fetch the data in order to render an image.

An additional characteristic of the Cube-4 system is that the computational processing required for volume rendering is organized into pipelines with specialized functions for this purpose. Each pipeline is capable of starting the processing of a new voxel in each cycle. Thus, in the first cycle, the pipeline fetches a voxel from its associated memory module and performs the first step of processing. Then in the second cycle, the pipeline performs the second step of processing of this first voxel, while at the same time fetching the second voxel and performing the first step of processing this voxel. Likewise, in the third cycle, the pipeline performs the third processing step of the first voxel, the second processing step of the second voxel, and the first processing step of the third voxel. In this manner, voxels from each memory module progress through its corresponding pipeline in lock-step fashion, one after the another, until all voxels are fully processed. Thus, instead of requiring 10 to 100 software instructions per voxel, a new voxel can be processed in every clock cycle.

Skewing can disperse adjacent voxels over any of the pipelines, and since the pipelines are dedicated to memory modules, the Cube-4 system must communicate voxel data with four other pipelines, i.e., the two neighboring pipelines on either side. Such communication is required, for example, to transmit voxel values from one pipeline to another for purposes such as estimating gradients or normal vectors so that lighting and shadow effects can be calculated. Pipeline interconnects are used to communicate the values of rays as they pass through the volume accumulating visual characteristics of the voxels in the vicinities of the areas through which they pass. Having, a large number of interconnects among the pipelines increases the complexity of the system.

In the Cube-4 system, volume rendering proceeds as follows. Data are organized as a cube or other parallelepiped data structure. Considering first the face of this cube or solid that is most nearly perpendicular to the view direction, a partial beam of P voxels at the top corner is fetched from P memory modules concurrently, in one memory cycle, and inserted into the first stage of the P processing pipelines. In the second cycle these voxels are moved to the second stage of their respective pipelines. At the same time, the next P voxels are fetched from the same beam and inserted into the first stage of their pipelines. In each subsequent cycle, P more voxels are fetched from the top beam and inserted into their pipelines, while previously fetched voxels move to later stages of their pipelines,. This continues until the entire beam of voxels has been processed. In the terminology of the Cube-4 system, a row of voxels is called a "beam" and a group of P voxels within a beam is called a "partial beam."

After the groups of voxels in a beam have been processed, the voxels of the next beam are processed, and so on, until all of the beams of the face of the volume date set have been fetched and inserted into their processing pipelines. This face is called a "slice." Then, the Cube-4 system moves again to the top corner, but this time starts fetching the P voxels in the top beam immediately behind the face, that is from the second "slice." In this way, it progresses through the second slice of the data set, a beam at a time and within each beam, P voxels at time. After completing the second slice, it proceeds to the third slice, then to subsequent slices in a similar manner, until all slices have been processed. The purpose of this approach is to fetch and process all of the voxels in an orderly way, P voxels at a time, until the entire volume data set has been processed and an image has been rendered.

The processing stages of the Cube-4 system perform all of the calculations required for the ray-casting technique, including interpolation of samples, estimation of the gradients or normal vectors, assignments of colors and transparency or opacity, and calculation of lighting and shadow effects to produce the final image on the two dimensional view surface.

The Cube-4 system is designed to be capable of being implemented in semiconductor technology. However, two limiting factors prevent Cube-4 from achieving the small size and low cost necessary for personal or desktop-size computers, namely the rate of accessing voxel values from memory modules, and the amount of internal storage required in each processing pipeline. With regard to the rate of accessing memory, the method of skewing voxel data across memory modules in Cube-4 leads to inefficient patterns of accessing voxel memory that are a slow as random accesses. Therefore, in order to achieve real-time volume rendering performance, voxel memory in a practical implementation of Cube-4 must either comprise very expensive static random access memory (SRAM) modules or a very large number of independent Dynamic Random Access Memory (DRAM) modules to provide adequate access rates. With regard to the internal storage, the Cube-4 algorithm requires that each processing pipeline stores intermediate results within itself during processing, the amount of storage being proportional to the area of the face of the volume data set being rendered. For a $256^3$ data set, this amount turns out to be so large that the size of a single chip processing pipeline is excessive, and therefore impractical for a personal computer system.

In order to make real-time volume rendering practical for personal and desktop computers, an improvement upon the Cube-4 system referred to as "EM Cube" employs techniques including architecture modifications to permit the use of high capacity, low cost Dynamic Random Access Memory or DRAM devices for memory modules. The EM Cube system is described in U.S. patent application Ser. No. 08/905,238, filed Aug. 1, 1997, entitled "Real-Time PC Based Volume Rendering System", and is further described in a paper by R. Osborne, H. Pfister, et al. entitled "EM-Cube: An Architecture for Low-Cost Real-Time Volume Rendering," published in the Proceedings of the 1997 SIGGraph/Eurographics Workshop on Graphics Hardware, Los Angeles, California, on Aug. 3–4, 1997.

The EM-Cube system utilizes DRAM chips that support "burst mode" access to achieve both low cost and high access rates to voxel memory. In order to exploit the burst mode, EM Cube incorporates architectural modifications that are departures from the Cube-4 system. In a first modification, called "blocking," voxel data are grouped into blocks, independent of a view direction, so that all voxels within a block are stored at consecutive memory addresses within a single memory module. Each processing pipeline fetches an entire block of neighboring voxels in a burst rather than one voxel at a time. In this way, a single processing pipeline can access memory at data rates of 125 million or more voxels per second, thus making it possible for four processing pipelines and four DRAM modules to render $256^3$ data sets at 30 frames per second.

In EM Cube, each block is processed in its entirety within the associated processing pipeline. EM Cube employs an inter-chip communication scheme to enable each pipeline to communicate intermediate values to neighboring pipelines as required. For example, when a pipeline in EM Cube encounters either the right, bottom or rear face of a block, it is necessary to transmit partially accumulated rays and other intermediate values to the pipeline that is responsible for processing the next block located on the other side of the respective face. Significant inter-chip communication bandwidth is required to transmit these intermediate values to any other pipeline. However, the amount of inter-chip communication is reduced by blocking.

Like Cube 4, the EM Cube architecture is designed to be scalable, so that the same basic building blocks can be used to build systems with significantly different cost and performance characteristics. In particular, the above-described block processing technique and inter-chip communication structure of EM Cube are designed such that systems using different numbers of chips and processing pipelines can be implemented. Thus, block-oriented processing and high-bandwidth inter-chip communication help EM Cube to achieve its goals of real-time performance and scalability. It will be appreciated, however, that these features also have attendant costs, notably the cost of providing area within each processing pipeline for block storage buffers and also the costs of chip I/O pins and circuit board area needed to effect the inter-chip communication.

In a second modification to the Cube-4 architecture, EM Cube also employs a technique called "sectioning" in conjunction with blocking in order to reduce the amount of on-chip buffer storage required for rendering.

In this technique, the volume data set is subdivided into sections and rendered a section at a time. Partially accumulated rays and other intermediate values are stored in off-chip memory across section boundaries. Because each section presents a face with a smaller area to the rendering pipeline, less internal storage is required. The effect of that technique is to reduce the amount of intermediate storage in a processing pipeline to an acceptable level for semiconductor implementation.

Sectioning in EM Cube is an extension of the basic block-oriented processing scheme and is supported by some of the same circuitry required for the communication of intermediate values necessitated by the block processing architecture. However, sectioning in EM Cube results in very bursty demands upon off-chip memory modules in which partially accumulated rays and other intermediate values are stored. That is, intermediate data are read and written at very high data rates when voxels near a section boundary are being processed, while at other times no intermediate data are being read from or written to the off-chip memory. In EM Cube it is sensible to minimize the amount of intermediate data stored in these off-chip memory modules in order to minimize the peak data rate to and from the off-chip memory when processing near a section boundary. Thus in EM Cube many of the required intermediate values are re-generated within the processing pipelines rather than being stored in and retrieved from the off-chip memory modules. During the processing carried out in each section near the boundary with the preceding section, voxels from the preceding section are re-read and partially processed in order to re-establish the intermediate values in the processing pipeline that are required for calculation in the new section.

While the EM Cube system achieves greater cost effectiveness than the prior Cube 4 system, it would be desirable to further lower costs to enable more widespread enjoyment of the benefits of volume rendering. Further, it would be desirable to achieve such cost reductions while retaining real-time performance levels. It would also be desirable to achieve rendering performance of $256^3$ voxels at 24 frames per second, or better, with a single integrated semiconductor chip.

SUMMARY OF THE INVENTION

The invention provides a volume rendering integrated circuit including a plurality of interconnected pipelines. Each identical pipeline includes multiple different rendering stages. In one embodiment, the stages of the pipelines are interconnected in a ring, with data being passed in only one direction around the ring to one immediate adjacent neighboring pipeline. The volume rendering integrated circuit also includes a render controller for controlling the flow of volume data to and from the pipelines and for controlling the various rendering operations of the pipelines. The integrated circuit may further include interfaces for coupling the integrated circuit to various storage devices and to a host computer. According to one aspect of the invention, a volume rendering graphics device renders a volume data set arranged as an array of voxels. The device includes a plurality of pipelines. The pipelines operate in parallel. The plurality of pipelines are coupled in a ring, and each one of the plurality of pipelines forwards data to only one other neighboring pipeline in the ring.

According to another aspect of the invention, a volume graphics integrated circuit includes a plurality of pipelines connected to a host device. A memory interface couples the plurality of pipelines to a first storage device storing a volume data set. A pixel interface couples the plurality of pipelines to a second storage device, the second storage device for storing pixel data representative of one view of the volume data set stored in the first storage device. A section interface couples the plurality of pipelines to a third storage device, the third storage device for storing rendering data associated with at least a section of the portion of the volume data set.

BRIEF DESCRIPTION OF THE DRAWINGS

These and other aspects of the invention are described below with reference to the attached drawings, in which like reference numbers refer to like elements in the different drawings, and wherein:

FIG. 16 illustrates exemplary control registers that may be used to control the parallel processing pipelines of FIG. 14.

DETAILED DESCRIPTION OF THE PREFERRED EMBODIMENTS

As an introduction to volume rendering, a brief description of the basic coordinate system used during rendering will be given with reference to FIG. 1. There are four basic coordinate systems in which the voxels of a volume data 10 set may be referenced—object coordinates (u,v,w) 3, permuted coordinates (x,y,z) 11, base plane coordinates. ($X_b$, $Y_b$,$Z_b$) 4, and image space coordinates ($x_i$, $y_i$,$z_i$) 5. The object and image space coordinates are typically right-handed coordinate systems. The permuted coordinate system may be either right-handed or left-handed, depending upon a selected view direction.

The volume data set is an array of voxels 12 defined in object coordinates with axes u, v, and w. The origin is located at one corner of the volume, typically a corner representing a significant starting point from the object's own point of view. The voxel at the origin is stored at the base address of the volume data set stored in a memory, as will be described later herein. Any access to a voxel in the volume data set is expressed in terms of u, v and w, which are then used to obtain an offset from this address. The unit distance along each axis equals the spacing between adjacent voxels along that axis.

Figure 1:
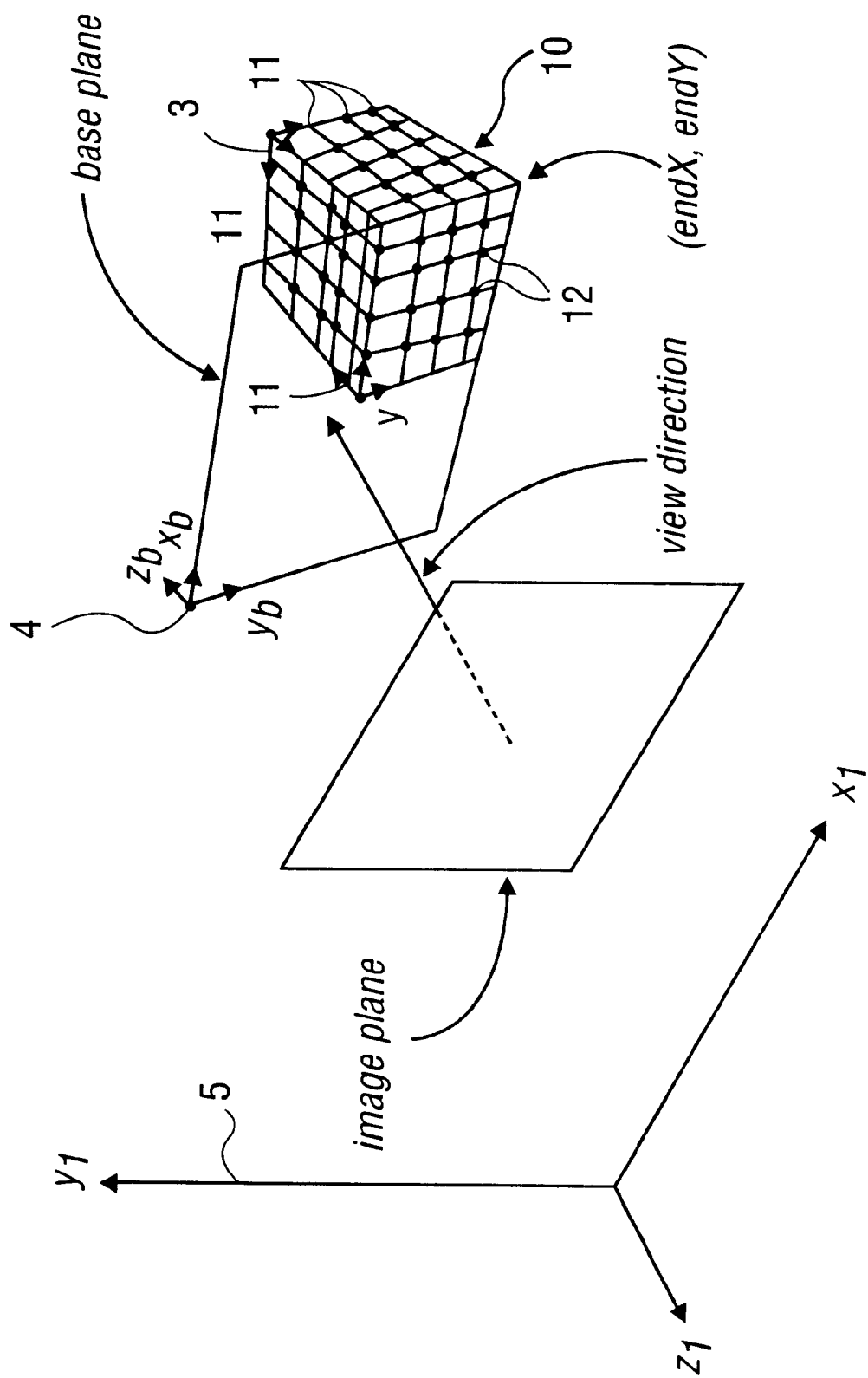
FIG. 1 is a diagrammatic illustration of coordinate systems used while rendering a volume data set.

FIG. 1 illustrates an example of the volume data set 10. It is rotated so that the origin of the object is in the upper, right, rear corner. That is, the object. represented by the data set is being viewed from the back, at an angle. In the permuted coordinate system (x,y,z), represented by 11, the origin is repositioned to the vertex of the volume nearest a two-dimensional viewing surface or image plane. The z-axis is the edge of the volume most nearly parallel to the view direction. The x-and y-axes are selected such that the traversal of voxels in the volume data set 10 always occurs in a positive direction. In FIG. 1, the origin of the permuted coordinate system is the opposite corner of the volume from the object's own origin.

The base plane coordinate system coordinates ($X_b$, $Y_b$, $Z_b$) is a system in which the $Z_b$=0 plane is co-planar with the xy-face of the volume data set in permuted coordinates. The base plane is a finite plane that extends from the base plane origin to a maximum point that depends upon both the size of the volume data set and upon the view direction.

The image space coordinate system ($x_i$, $y_i$,$z_i$), is the coordinate system of the final image resulting from rendering the volume. The $z_i$=0 plane is the plane of the computer screen, printed page or other medium on which the volume is to be displayed.

FIG. 1 depicts a view of the three dimensional volume data set 10 with an array of voxel positions 12 arranged in the form of a parallelepiped.

More particularly, the voxel positions 12 are arranged in three dimensions and are spaced in a regular pattern. The position of each voxel can be represented in a coordinate system defined by the three axes 11 labeled x, y, and z using permuted coordinates. Associated with each voxel position 12 is one or more data values each representing a characteristic of an object, system, or phenomenon, for example density, type of material, temperature, velocity, opacity or other properties at discrete points in space throughout the interior and in the vicinity of that object or system. It is convenient to represent a volume data set in a computer as an array of values, with the value at array index position (x, y, z) corresponding to the volume data values at coordinates (x, y, z) in three dimensional space.

The x, y and z axes are chosen as follows. First, the origin is the vertex of the volume data set 10 that is nearest to an image plane (described in FIG. 2 below) on which the rendered volume is to be displayed. Then the axis most nearly parallel to the direction from which the object is being viewed (known as the "view direction") is chosen as the z axis. The x and y axes are arbitrarily chosen from among the remaining two axes, typically. to form a right-handed coordinate system. As a result of this method of choosing, the z coordinate of a line extending in the view direction away from the image plane through the volume data set 10 is always increasing, and the x and y coordinates are either increasing or constant, but never decreasing.

Figure 2:
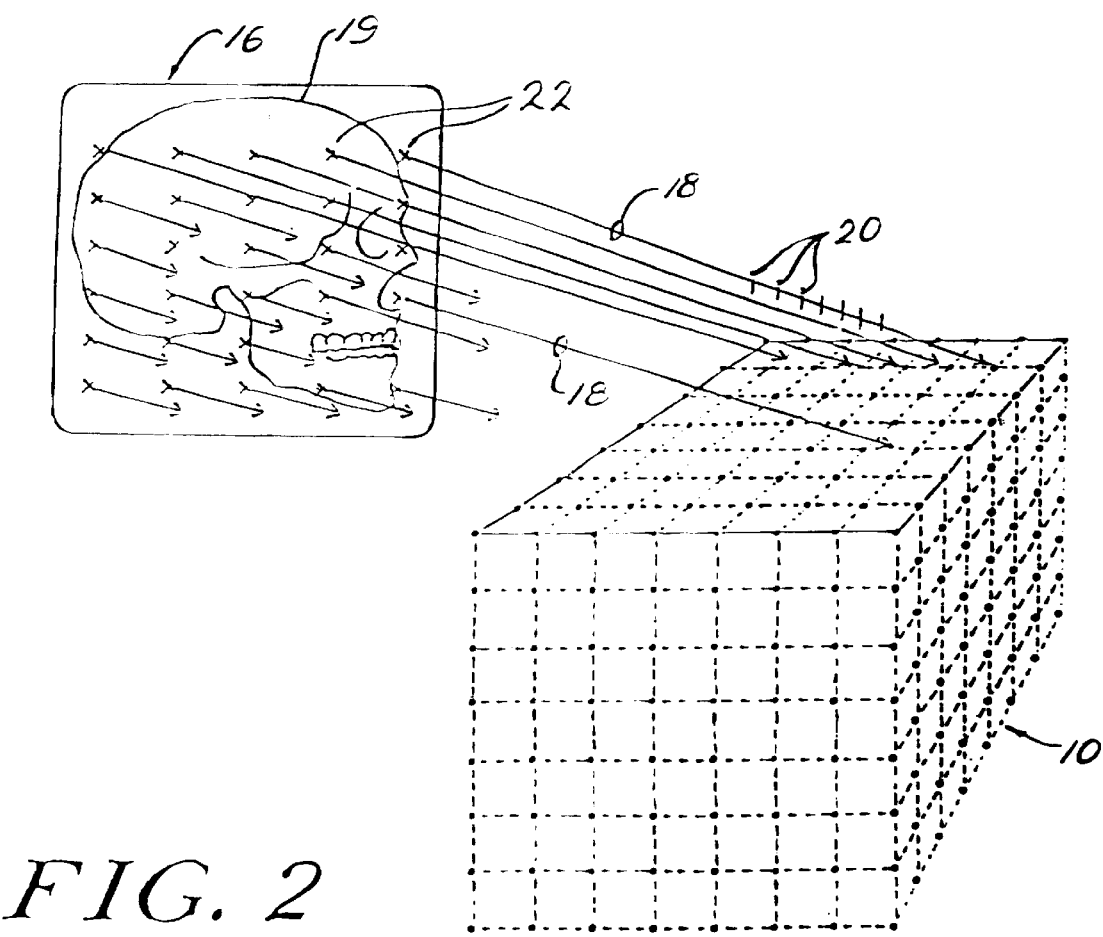
FIG. 2 is a diagrammatic illustration of a view of a volume data set being projected onto an image plane by means of ray casting.

FIG. 2 illustrates an example of a volume data set 10 comprising an array of slices from a tomographic scan of the human head. A two dimensional image plane 16 represents the surface on which a volume rendered projection of the human head is to be rendered. In a technique known as ray casting, imaginary rays 18 are cast from pixel positions 22 on the image plane 16 through the volume data set 10, with each ray 18 accumulating color and opacity from the data at voxel positions as it passes through the volume. In this manner, the color, transparency, and intensity as well as other parameters of a pixel are extracted from the volume data set as the accumulation of data at sample points 20 along the ray. In this example, voxel values associated with bony tissue are assigned an opaque color, and voxel values associated with all other tissue in the head are assigned a transparent color. Therefore, the result of accumulation of data along a ray and the attribution of this data to the corresponding pixel result in an image 19 in the image plane 16 that appears to an observer to be an image of a three dimensional skull, even though the actual skull is hidden from view by the skin and other tissue of the head.

Figure 3:
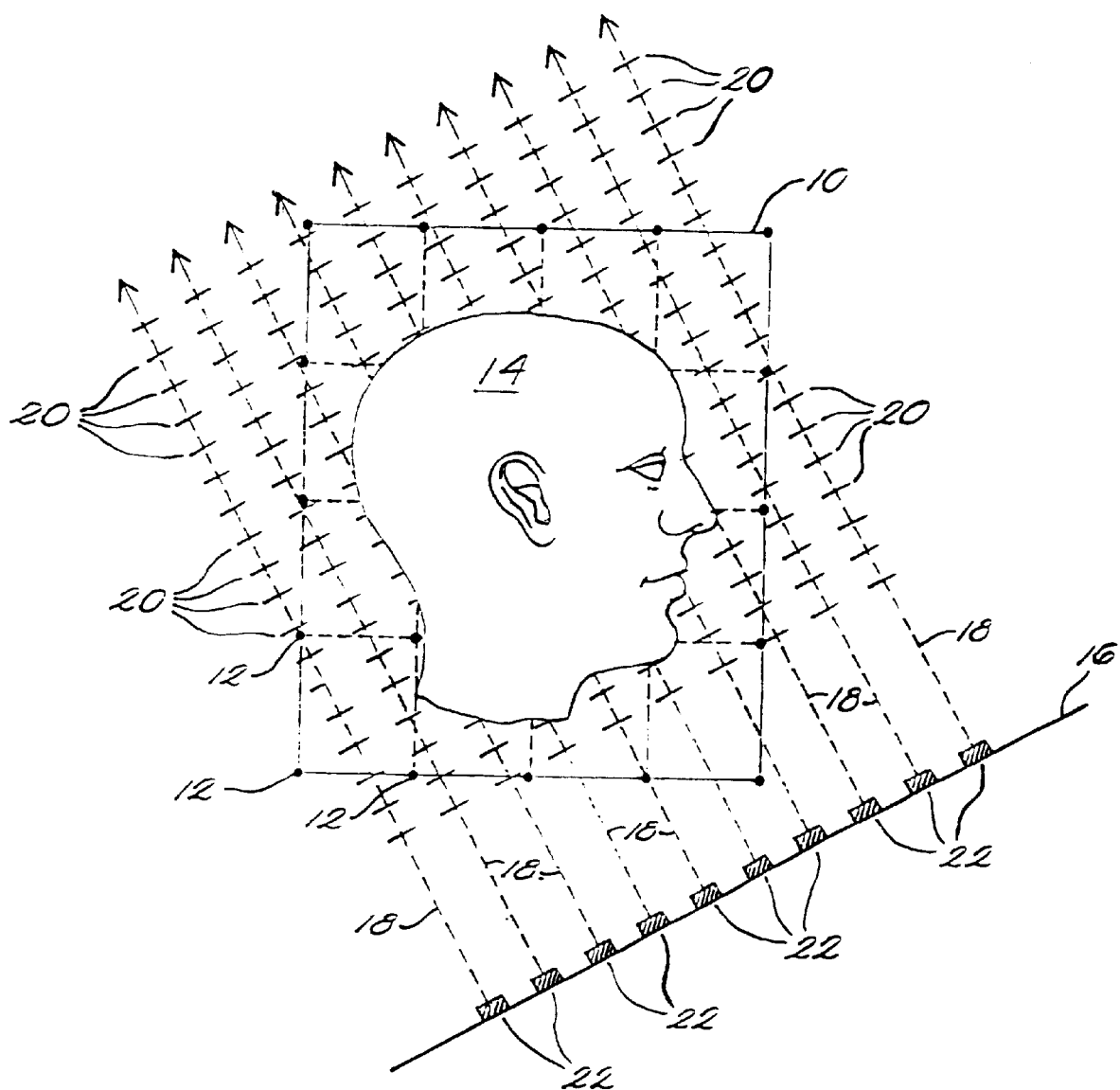
FIG. 3 is a cross-sectional view of the volume data set of FIG. 2.

In order to appreciate more fully the method of ray casting, FIG. 3 depicts a two dimensional cross section of the three dimensional volume data set 10 of FIG. 2. The first and second dimensions correspond to the dimensions illustrated on the plane of the page. The third dimension of volume data set 10 is perpendicular to the printed page so that only a cross section of the data set 20 can be seen in the figure. Voxel positions are illustrated by dots 12 in the figure. The voxels associated with each position are data values that represent some characteristic or characteristics of a three dimensional object 14 at fixed points of a rectangular grid in three dimensional space. Also illustrated in FIG. 3 is a one dimensional view of the two dimensional image plane 16 onto which an image of object 14 is to be projected in terms of providing pixels 22 with the appropriate characteristics. In this illustration, the second dimension of image plane 16 is also perpendicular to the printed page.

In the technique of ray casting, rays 18 are extended from pixels 22 of the image plane 16 through the volume data set 10. The rays 18 are cast perpendicular to the image plane 16. Each ray 18 accumulates color, brightness, and transparency or opacity at sample points 20 along that ray. This accumulation of light determines the brightness and color of the corresponding pixels 22. Thus while the ray is depicted going outwardly from a pixel through the volume, the accumulated data can be thought of as being transmitted back along the ray where the data are provided to the corresponding pixel to give the pixel color, intensity and opacity or transparency, amongst other parameters.

It will be appreciated that although FIG. 3 suggests that the third dimension of volume data set 10 and the second dimension of image plane 16 are both perpendicular to the page, and therefore parallel to each other, in general this is not the case. The image plane may have any orientation with respect to the volume data set, so that rays 18 may pass through the volume data set 10 at any angle in all three dimensions.

It will also be appreciated that sample points 20 do not necessarily intersect the voxel 12 coordinates exactly. Therefore, the value of each sample point are synthesized from the values of voxels nearby. That is, the intensity of light, color, and transparency or opacity at each sample point 20 are interpolated as a function of the values of nearby voxels 12. The resampling of voxel data values to values at sample points is done in accordance with sampling theory. The sample points 20 of each ray 18 are then accumulated by another function to produce the brightness and color of the pixel 22 corresponding to that ray. The resulting set of pixels 22 forms a visual image of the object 14 in the image plane 16.

Figure 4:
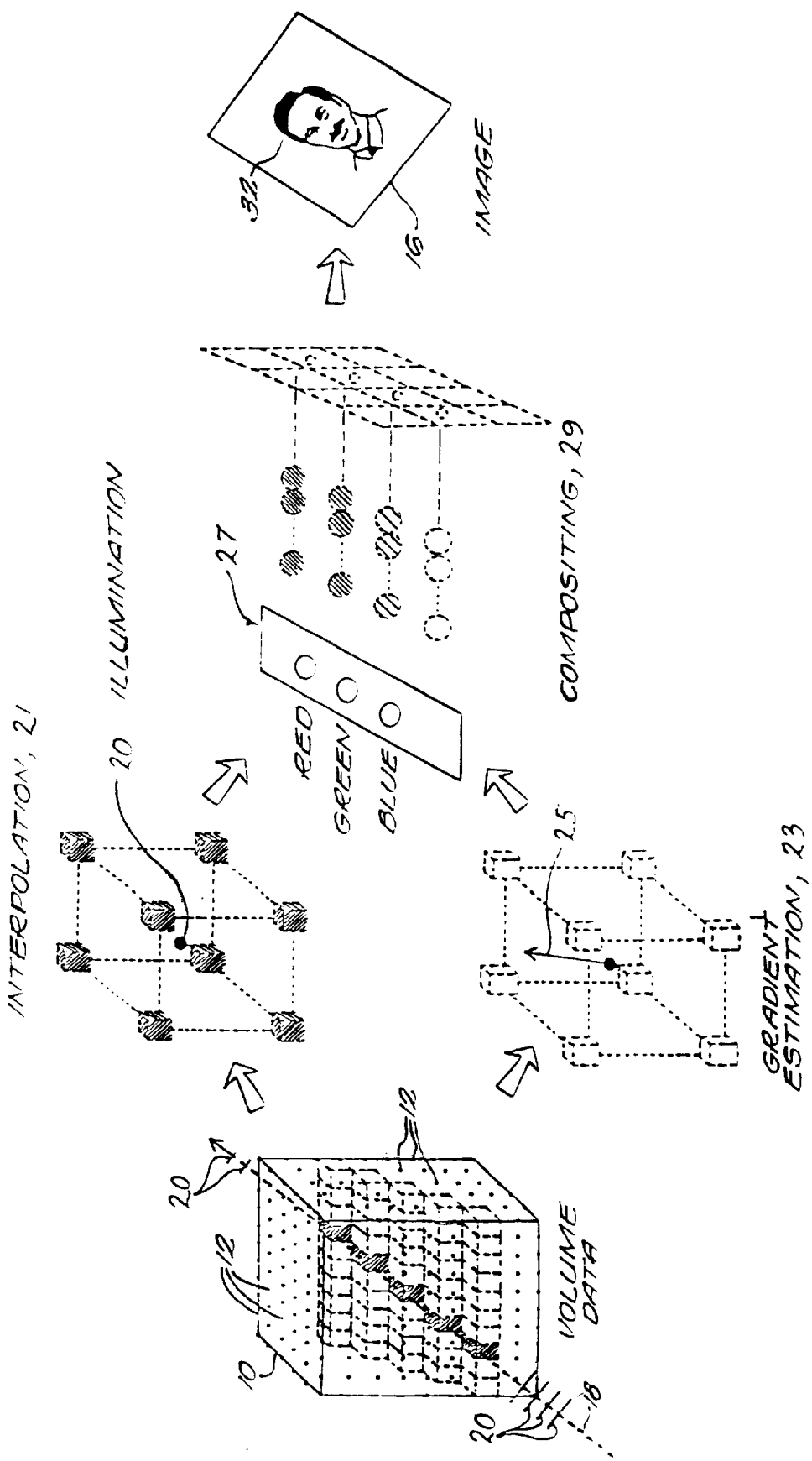
FIG. 4 is a diagrammatic illustration of the processing of an individual ray by ray casting.

FIG. 4 illustrates the processing of an individual ray 18. Ray 18 passes through the three dimensional volume data set 10 at some angle, passing near or possibly through voxel positions 12, and accumulates data at sample points 20 along each ray. The value at each sample point is synthesized as illustrated at 21 by an interpolation unit 104 (see FIG. 5), and the gradient at each sample point is calculated as illustrated at 23 by a gradient estimation unit 112 (see FIG. 5). The sample point values from sample point 20 and the gradient 25 for each sample point are then processed to assign color, brightness or intensity, and transparency or opacity to each sample. As illustrated at 27, this processing is done via pipeline processing in which red, green and blue hues as well as intensity and opacity or transparency are calculated. Finally, the colors, levels of brightness, and transparencies assigned to all of the samples along all of the rays are applied as illustrated at 29 to a compositing unit 124 that mathematically combines the sample values into pixels depicting the resulting image 32 for display on image plane 16.

The calculation of the color, brightness or intensity, and transparency of sample points 20 is done in two parts. In one part, a function such as trilinear interpolation is utilized to take the weighted average of the values of the eight voxels in a cubic arrangement immediately surrounding the sample point 20. The resulting average is then used to assign a color and opacity or transparency to the sample point by some transfer function. In the other part of the calculation, the gradient of the sample values at each sample point 20 is estimated by a method such as taking the differences between nearby sample points. It will be appreciated that these two calculations can be implemented in either order or in parallel with each other to produce equivalent results. The gradient is used in a lighting calculation to determine the brightness of the sample point. Lighting calculations are well known in the computer graphics art and are described, for example, in the textbook "Computer Graphics: Principles and Practice," 2nd edition, by J. Foley, A. van Dam, S. Feiner, and J. Hughes, published by Addison Wesley of Reading, Mass. in 1990.

Rendering Pipeline

Figure 5A:
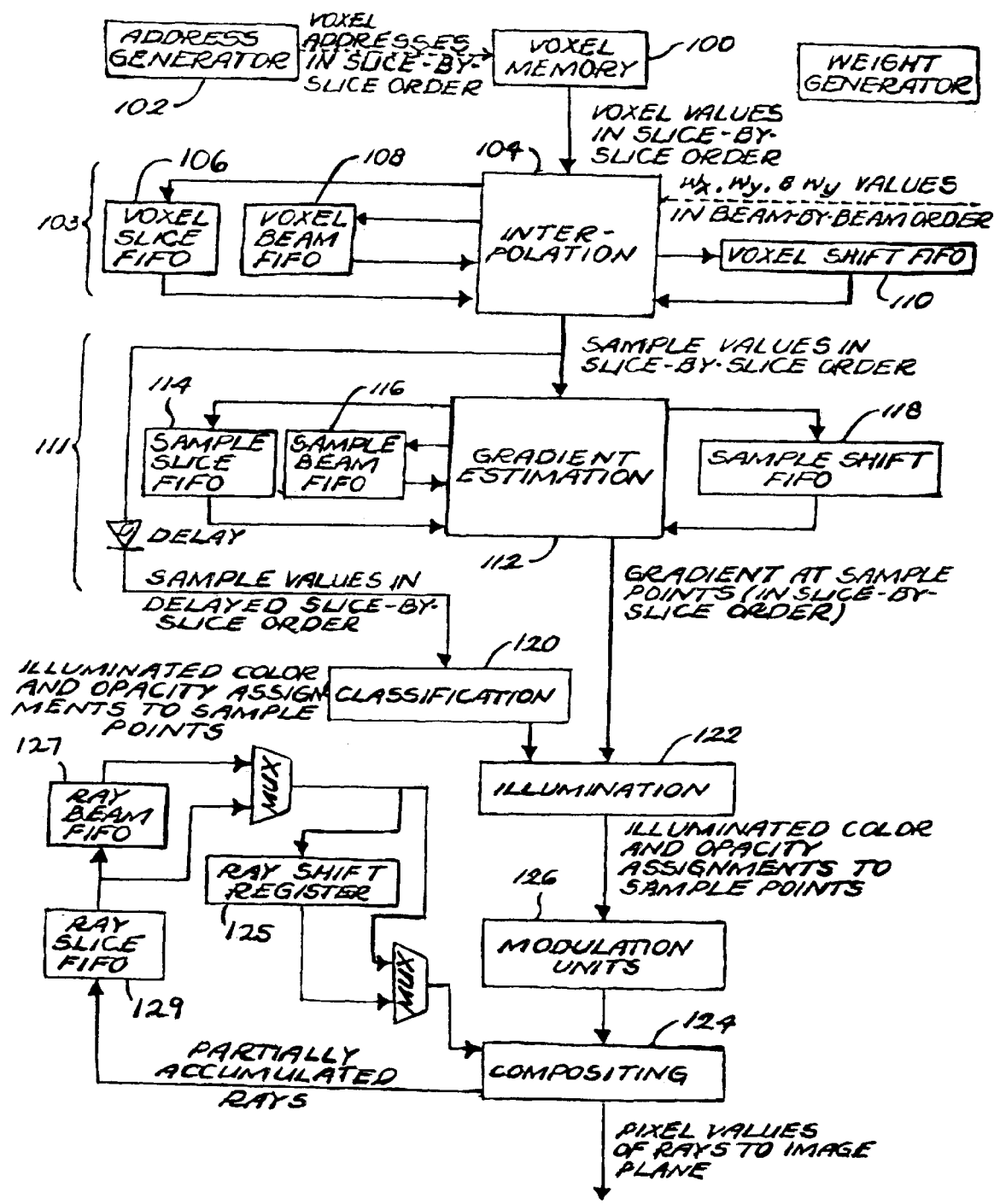
FIGS. 5A and 5B are block diagrams of various embodiments of a pipeline capable of performing real time volume rendering in accordance with the present invention.

FIG. 5A depicts a block diagram of one embodiment of a pipeline processor appropriate for performing the calculations illustrated in FIG. 4. The pipelined processor comprises a plurality of pipeline stages, so that a plurality of data elements are processed in parallel at one time. Each data element is at a different stage of progress in its processing, and all data elements move from stage to stage of the pipeline in lock step. At the first stage of the pipeline, a series of voxel data values flow into the pipeline at a rate of one voxel per cycle from a voxel memory 100, which operates under the control of an address generator 102. The interpolation unit 104 receives voxel values located at coordinates x, y and z in three dimensional space, where x, y and z are each integers. The interpolation unit 104 is a set of pipelined stages that synthesize data values at sample points between voxels corresponding to positions along rays that are cast through the volume. During each cycle, one voxel enters the interpolation unit and one interpolated sample value emerges. The latency between the time a voxel value enters the pipeline and the time that an interpolated sample value emerges depends upon the number of pipeline stages and the internal delay in each stage.

The interpolation stages of the pipeline comprise a set of interpolator stages 104 and three delay elements 106, 108, 110. The delay elements, implemented as, for example, FIFO buffers,. delay data produced in the stages so that results of the stages can be combined with later arriving data. In the current embodiment, the interpolations are linear, but other interpolation functions such as cubic and LaGrangian may also be employed. In the illustrated embodiment, interpolation is performed in each dimension as a separate stage, and the respective FIFO elements are included to delay data for purposes of interpolating between voxels that are adjacent in space but separated in the time of entry to the pipeline. The delay of each FIFO is selected to be exactly the amount of time elapsed between the reading of one voxel and the reading of an adjacent voxel in that particular dimension so that the two voxels can be combined by the interpolation function. It will be appreciated that voxels can be streamed through the interpolation stage at a rate of one voxel per cycle with each voxel being combined with the nearest neighbor that had been previously delayed through the FIFO associated with that dimension.

Within the interpolation stage 104, three successive interpolation stages, one for each dimension, are cascaded. Voxels pass through the three stages at a rate of one voxel per cycle at both input and output. The throughput of the interpolation stages is one voxel per cycle. The throughput is independent of the number of stages within the interpolation unit and independent of the latency of the data within the interpolation unit, and the latency of the delay buffers that unit. Thus, the interpolation unit converts voxel values located at integer positions in xyz space into sample values located at non integer positions at the rate of one voxel per cycle. In particular, the interpolation unit converts values at voxel positions to values at sample positions disposed along the rays.

Following the interpolation unit 104 is a gradient estimation unit 112, which also comprises a plurality of pipelined stages and delay FIFOs. The function of the gradient unit 112 is to derive the rate of change of the sample's intensity values in each of the three dimensions. The gradient estimation unit operates in a similar manner to the interpolation unit 104 and computes the rate of change of the sample values in each of the three dimensions. The gradient is used to determine a normal vector for illumination. The magnitude of the gradient is used to determine the existence of a surface. Typically, the existence of a surface is indicated when the magnitude of the gradient is high. In the present embodiment, the gradient calculation is performed by taking central differences, but other functions known in the art may be employed., Because the gradient estimation unit 112 is pipelined, it receives one interpolated sample per cycle, and it outputs one gradient per cycle. As with the interpolation unit 104, each gradient is delayed from its corresponding sample by a number of cycles which is equal to the amount of latency in the gradient estimation unit 112, including respective delay FIFOs 114, 116, 118. The delay for each of the FIFOs is determined by the length of time needed between the reading of one interpolated sample and nearby interpolated samples necessary for deriving the gradient in that dimension.

The interpolated sample, and its corresponding gradient, are concurrently applied to the classification and illumination units 120 and 122 respectively at a rate of one interpolated sample and one gradient per cycle. Classification unit 120 serves to convert interpolated sample values into colors used by the graphics system; i.e., red, green, blue and alpha values, also known as RGBA values. The red, green, and blue values are typically values in the range of zero to one inclusive and represent the intensity of the color component assigned to the respective interpolated sample value. The alpha value is also typically in the range of zero and one inclusive and represents the opacity assigned to the respective interpolated sample value.

The gradient is applied to the illumination unit 122 to modify or modulate the newly assigned RGBA values by adding highlights and shadows to provide a more realistic image. Methods and functions for performing illumination are well known in the art. The illumination and classification units 120,122 accept one interpolated sample value and one gradient per cycle and output one illuminated color and opacity value per cycle.

Modulation units 126 receive illuminated RGBA values from the illumination unit 122 to permit modification of the illuminated RGBA values, thereby modifying the image that is ultimately viewed. One such modulation unit 126 is used for cropping the sample values to permit viewing of a restricted subset of the data. Another modulation unit 126 provides a function to show a slice of the volume data at an arbitrary angle and thickness. A third modulation unit 126 provides a three-dimensional cursor to allow the user or operator to identify positions in xyz space within the data. Each of the above identified functions is implemented as a plurality of pipelined stages accepting one RGBA value as input per cycle and emitting as an output one modulated RGBA value per cycle. Other modulation functions may also be provided which may likewise be implemented within the pipelined architecture herein described. The addition of the pipelined modulation units 126 does not diminish the throughput (rate) of the processing pipeline in any way but rather affects the latency of the data passing through the pipeline.

The compositing unit 124 combines the illuminated color and opacity values of all sample points along a ray 18 to form a final pixel value corresponding to that ray for display on the computer terminal or two dimensional image surface 16. RGBA values enter the compositing unit 124 at a rate of one RGBA value per cycle and are accumulated with the RGBA values at previous sample points along the same ray. When the accumulation is complete, the final accumulated value is output as a pixel 22 to the display or stored as image data. The compositing unit 124 receives one RGBA sample per cycle and accumulates these ray by ray according to a compositing function until the ends of rays are reached, at which point the one pixel per ray is output to form the final, image. A number of different functions well known in the art can be employed in the compositing unit 124, depending upon the application.

In order to achieve a real-time volume rendering rate of, for example, 30 frames per second for a volume data set with 256×256×256 voxels, voxel data enters the pipelines at 256×30 frames per second or approximately 500 million voxels per second. Although the calculations associated with any particular voxel involve many stages and therefore have a specified latency, calculations associated with a plurality of different voxels can be in progress at once, each voxel being at a different degree of progression and occupying a different stage of the pipeline. This makes it possible to sustain a high processing rate despite the complexity of the calculations.

In the illustrated embodiment of FIG. 5A, the interpolation unit 104 precedes the gradient estimation unit 112, which in turn precedes the classification unit 120. In other embodiments these three units may be arranged in a different order. In particular, for some applications of volume rendering it is preferable that the classification unit precede the interpolation unit. In this case, data values at voxel positions are converted to RGBA values at the same positions as the voxels, then these RGBA values are interpolated to obtain RGBA values at sample points along rays.

Figure 5B:
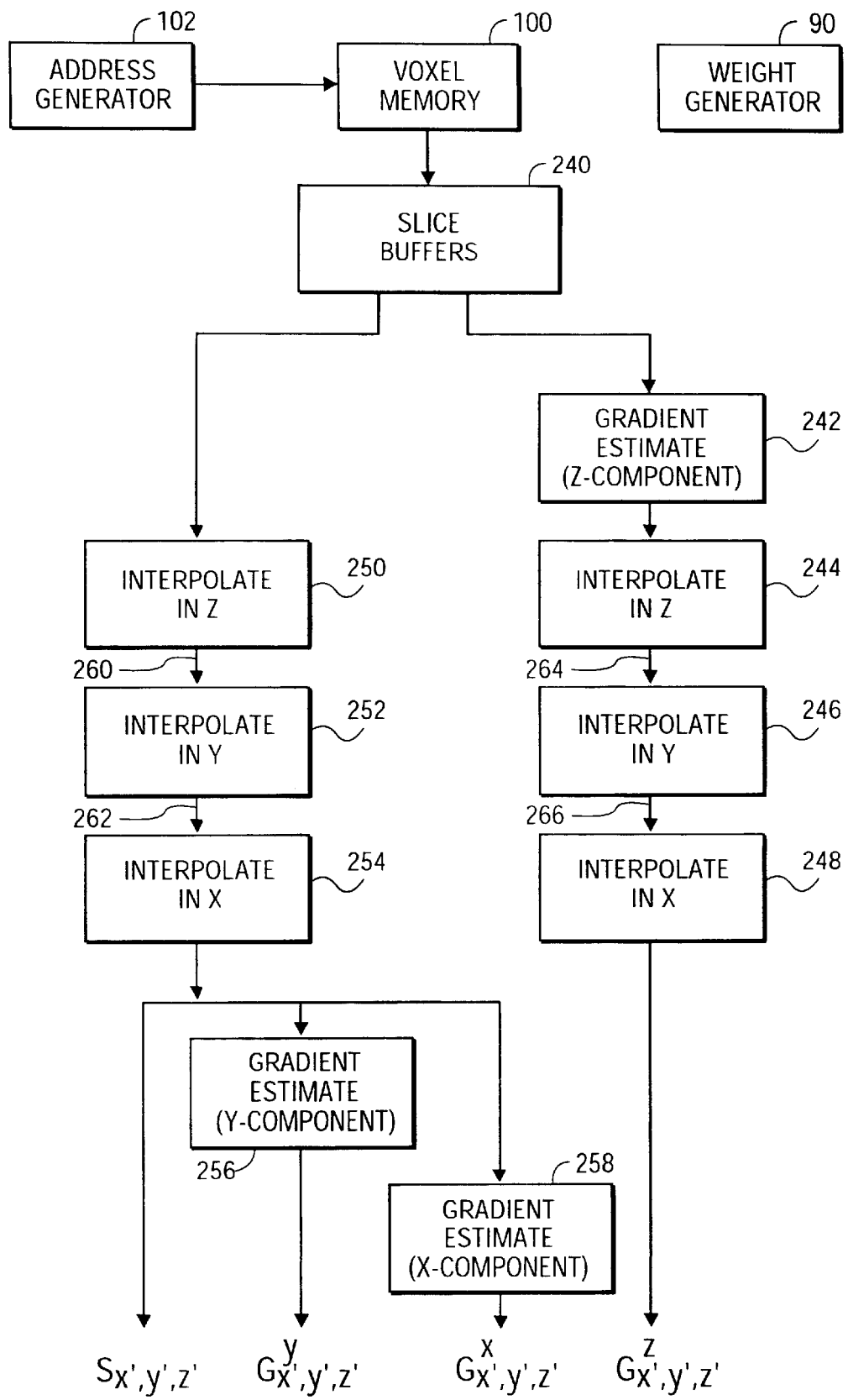

Referring now to FIG. 5B, a second embodiment of one portion of the pipelined processor of FIG. 5A is shown, where the order of interpolation and gradient magnitude estimation is different from that shown in FIG. 5A. In general, the x and y components of the gradient of a sample, Gx',y',z' and $G^{Y}$x',y',z', are each estimated as a "central difference," i.e., the difference between two adjacent sample points in the corresponding dimension. The x and y components of the gradients may therefore be represented as shown in below equation I:

Equation I:

$$G^{x}_{x',y',z'} = S_{(x'+1),y',z'} - S_{(x'-1),y',z'}, \text{ and}$$

$$G^{y}_{x',y',z'} = S_{x',(y'+1),z'} - S_{x',(y'-1),z'}.$$

The calculation of the z component of the gradient (also referred to herein as the "z gradient") $G^{z}_{x',y',z'}$ is not so straightforward, because in the z direction samples are offset from each other by an arbitrary viewing angle. It is possible, however, to greatly simplify the calculation of $G^{z}_{x',y',z'}$ when both the gradient calculation and the interpolation calculation are linear functions of the voxel data (as in the illustrated embodiment). When both functions are linear, it is possible to reverse the order in which the functions are performed without changing the result. The z gradient is calculated at each voxel position 12 in the same manner as described above for $G^{x}$x',y',z' and $G^{y}_{x',y',z'}$, and then $G^{z}_{x',y',z'}$ is obtained at the sample point x',y',z' by interpolating the voxel z gradients in the z direction.

The embodiment of FIG. 5B is one illustrative embodiment that facilitates the calculation of the z gradient. A set of slice buffers 240 is used to buffer adjacent slices of voxels from the voxel memory 100, in order to time-align voxels adjacent in the z direction for the gradient and interpolation calculations. The slice buffers 240 are also used to de-couple the timing of the voxel memory 100 from the timing of the remainder of the processing unit when z-axis supersampling is employed, a function described in greater detail in patent application "Super-Sampling and Gradient Estimation in a Ray-Casting Volume Rendering System", attorney docket no. VGO-118, filed on Nov. 17, 1998 and incorporated herein by reference.

A first gradient estimation unit 242 calculates the z-gradient for each voxel from the slice buffers 240. A first interpolation unit 244 interpolates the z-gradient in the z direction, resulting in four intermediate values. These values are interpolated in the y and x directions by interpolation units 246 and 248 to yield the interpolated z-gradient $G^z_{x',y',z'}$. Similar to FIG. 5A, delay buffers (not shown) are used to temporarily store the intermediate 10 values from units 244 and 246 for interpolating neighboring z-gradients in a manner like that discussed above for samples.

The voxels from the slice buffers 240 are also supplied to cascaded interpolation units 250, 252 and 254 in order to calculate the sample values $S_{x',y',z'}$. These values are used by the classification unit 120 of FIG. 5, and are also supplied to additional gradient estimation units 256 and 258 in which the y and x gradients $G^y_{x',y',z'}$ and $G_{x',y',z'}$ respectively are calculated.

As shown in FIG. 5B, the calculation of the z-gradients $G^z_{x',y',z'}$ and the samples $S_{x',y',z'}$ proceed in parallel, as opposed to the sequential order of the embodiment of FIG. 5A. This structure has the benefit of significantly simplifying the z-gradient calculation. As another benefit, calculating the gradient in this fashion can yield more accurate results, especially at higher spatial sampling frequencies. The calculation of central differences on more closely-spaced samples is more sensitive to the mathematical imprecision inherent in a real processor. However, the benefits of this approach are accompanied by a cost, namely the cost of three additional interpolation units 244, 246 and 248. In alternative embodiments, it may be desirable to forego the additional interpolation units and calculate all gradients from samples alone. Conversely, it may be desirable to perform either or both of the x-gradient and y-gradient calculations in the same manner as shown for the z-gradient. In this way the benefit of greater accuracy can be obtained in a system in which the cost of the additional interpolation units is not particularly burdensome.

Either of the above described processor pipelines of FIGS. 5A and 5B can be replicated as a plurality of parallel pipelines to achieve higher throughput rates by processing adjacent voxels in parallel. The cycle time needed for each pipeline to achieve real-time volume rendering is determined by the number of voxels in a typical volume data set, multiplied by the desired frame rate, and divided by the number of pipelines. In the illustrated embodiment in which a volume data set of $256^3$ is to be rendered at 30 frames per second, four pipelines are employed.

Volume Rensdering System

Figure 6:
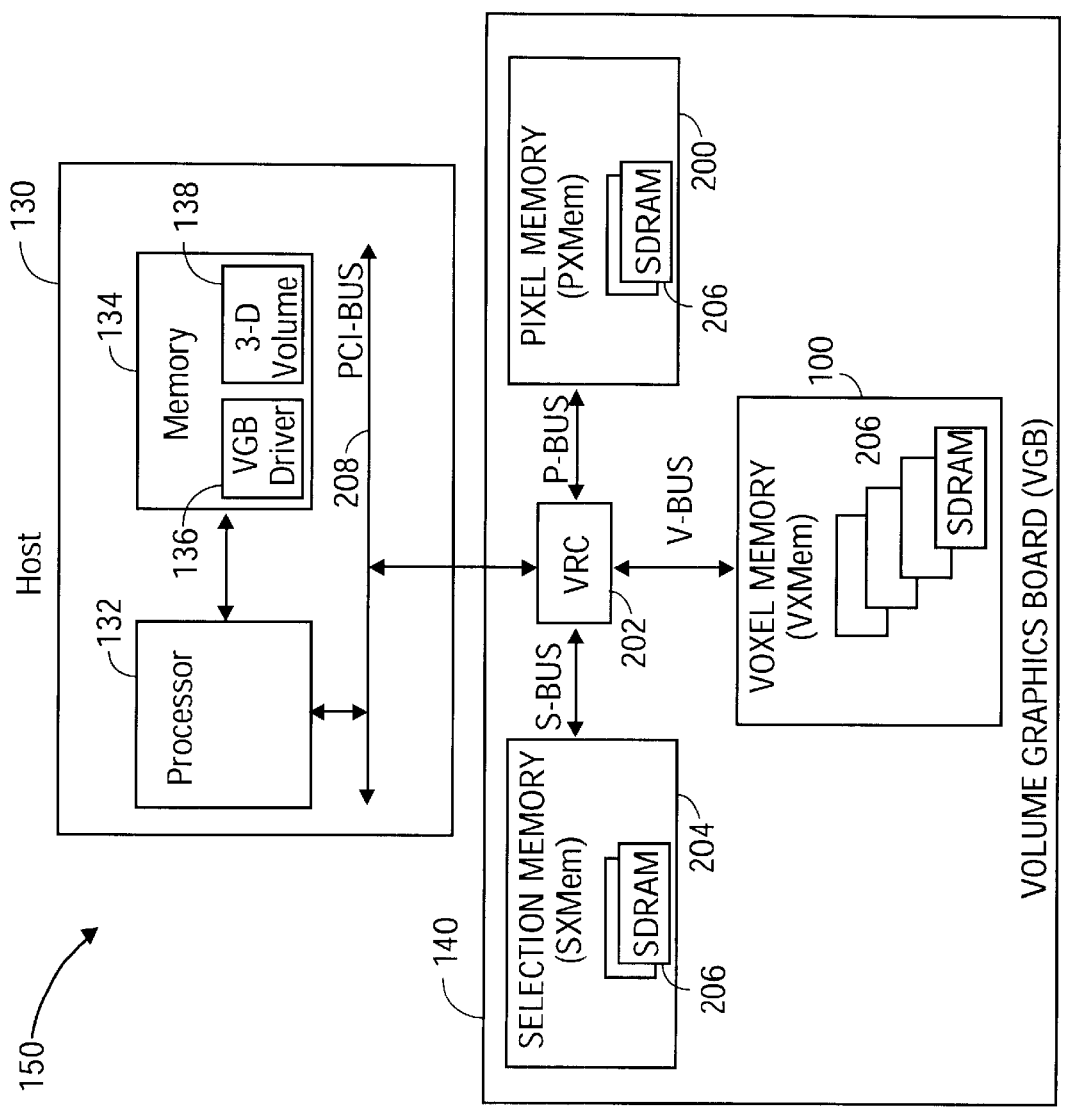
FIG. 6 is a block diagram of the logical layout of a volume graphics system including a host computer coupled to a volume graphics board operating in accordance with the present invention.

FIG. 6 illustrates one embodiment of a volume rendering system 150 that provides real-time interactive volume rendering. In the embodiment of FIG. 6, the rendering system 150 includes a host computer 130 interconnected to a volume graphics board (VGB) 140 by an interconnect bus 208. In one embodiment, an interconnect bus operating according to a Peripheral Component Interconnect (PCI) protocol is used to provide a path between the VGB 140 and the host computer 130. Alternative interconnects available in the art may also be used and the present invention is not limited to any particular interconnect.

The host computer 130 may be any sort of personal computer or workstation having a PCI interconnect. Because the internal architectures of host computers vary widely, only a subset of representative components of the host 130 are shown for purposes of explanation. In general, each host 130 includes a processor 132 and a memory 134. In FIG. 6, the memory 134 is meant to represent any combination of internal and external storage available to the processor 132, such as cache memory, disk and drives.

In FIG. 6, two components are shown stored in memory 134. These components include a VGB driver 136 and a volume data set 138. The VGB driver 136 is software is used to control VGB 140. The volume data set is an array of voxels, such as that described with reference to FIGS. 1–4, that is to be rendered on a display (not shown) by the VGB 140. Each voxel in the array is described by its voxel position and voxel value. The voxel position is a three-tuple (u,v,w) defining the coordinate of the voxel in object space as described above.

Voxels may comprise 8-, 12- or 16-bit intensity values with a number of different bit/nibble ordering formats. The present invention is not limited to any particular voxel format. Note that the voxel formats specifying what is in host memory and what exists in voxel memory are independent. Voxels are arranged consecutively in host memory, starting with the volume origin (u,v,w=0,0,0). Suppose sizeU, sizeV, and sizeW are the number of voxels in the host volume in each direction. Then the voxel with "voxel coordinates" (u,v,w) has position p=[u+v*sizeU+ w*sizeU*sizeV] in the array of voxels in host memory.

For 8-bit voxels p is the byte offset for voxel (u,v,w) from the volume origin. In the case of 12-bit or 16-bit voxels, multiply p by two to determine the byte offset. Voxels are mapped from object (u,v,w) space to permuted (x,y,z) space using a transform register. The transform register specifies how each axis in (u,v,w) space is mapped to an axis in (x,y,z) space, and the register also give the sign (direction) of each axis in (x,y,z) space.

During operation, portions of the volume 138 are transferred over the host bus 208 to the VGB 140 for rendering. In particular, the voxel data is transferred from the PCI-bus 208 to the voxel memory 100 by a Volume Rendering Chip (VRC) 202.

The VRC 202 includes all logic necessary for performing real-time interactive volume rendering operations. In one embodiment, the VRC 202 includes N interconnected rendering pipelines such as those described with regard to FIGS. 5A and 5B. Each processing cycle, N voxels are retrieved from voxel memory 100 and processed in parallel in the VRC 202. By processing N voxels in parallel, real time interactive rendering data rates may be achieved. A more detailed description of one embodiment of the VRC and its operation are provided below.

In addition to voxel memory 100, the video graphics board (VGB) 140 also includes section memory 204 and pixel memory 200. Pixel memory 200 stores pixels of the image generated by the volume rendering process and section memory 204 is used to store sections of a volume during rendering of the volume data set by the VRC 204. The memories 200, 202 and 204 include arrays of synchronous dynamic random-access memories (SDRAMs) 206. As shown, the VRC 202 has interface buses V-Bus, P-Bus, and S-Bus to communicate with the respective memories 200, 202 and 204. The VRC 202 also has an interface for an industry-standard PCI bus 208, enabling the volume graphics board to be used with a variety of common computer systems.

Figure 7:
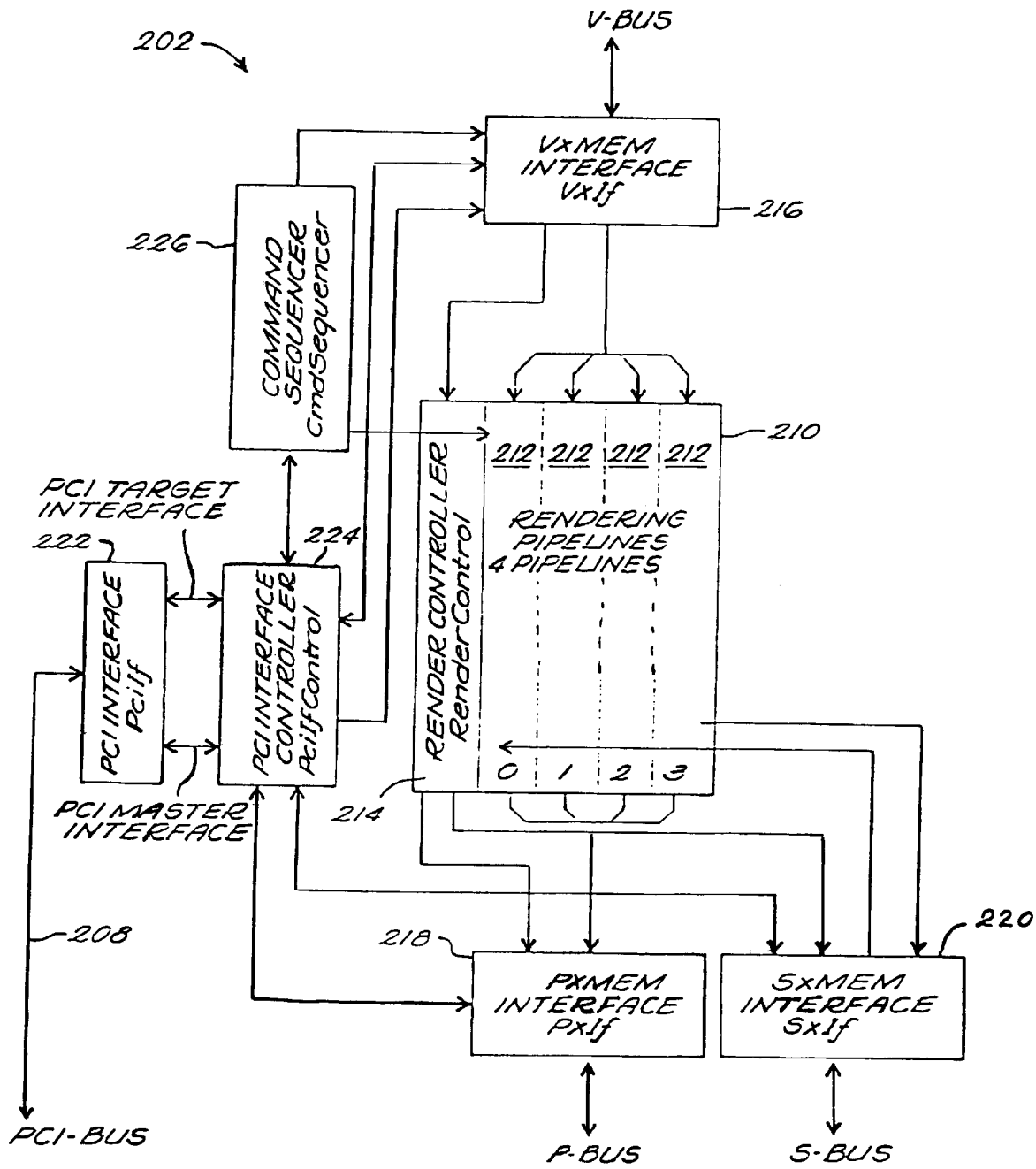
FIG. 7 is a block diagram of the general layout of a volume rendering integrated circuit on the circuit board of FIG. 6, where the circuit board includes the processing pipelines of either FIGS. 5A or 5B.

A block diagram of the VRC 202 is shown in FIG. 7. The VRC 202 includes a pipelined processing element 210 having 4 parallel rendering pipelines 212 (wherein each pipeline may have processing stages coupled like those in FIGS. 5A or 5B) and a render controller 214. The processing element 210 obtains voxel data from the voxel memory 100 via voxel memory interface logic 216, and provides pixel data to the pixel memory 200 via pixel memory interface logic 218. A section memory interface 220 is used to transfer read and write data between the rendering engine 210 and the section memory 204 of FIG. 6. A PCI interface 222 and PCI interface controller 224 provide an interface between the VRC 202 and the PCI bus 208. A command sequencer 226 synchronizes the operation of the processing element 210 and voxel memory interface 216 to carry out 15 operations specified by commands received from the PCI bus.

The four pipelines 212-0- 212-3 operate in parallel in the x direction, i.e., four voxels $V_{x,y,z}$, $V_{(x+1),y,z}$, $V_{(x+2),y,z}$, $V_{(x+3),y,z}$ are operated on concurrently at any given stage in the four pipelines 212-0- 212-3. The voxels are supplied to the pipelines 212-0-212-3, respectively, in 4-voxel groups in a scanned order in a manner described below. All of the calculations for data positions having a given x coefficient modulo 4 are processed by the same rendering pipeline. Thus it will be appreciated that to the extent intermediate values are passed among processing stages within the pipelines 212-0 for calculations- in the y and z direction, these intermediate values are retained within the rendering pipeline in which they are generated and used at the appropriate time.

Intermediate values for calculations in the x direction are passed from each pipeline (for example 212-0) to a neighboring pipeline (for example, 212-1) at the appropriate time. The section memory interface 220 and section memory 204 of FIG. 6 are used to temporarily store intermediate data results when processing a section of the volume data set 10, and to provide the saved results to the pipelines when processing another section. Sectioning-related operation is described in greater detail below.

Volume Rendering Data Flow

The rendering of volume data can include the following process steps. First, the volumetric data set is transferred from host memory 134 to the volume graphics board 140 and stored in voxel memory 100, and then the set is apportioned into one or more sections to reduce the size of the buffers.

Each processing cycle, voxels are retrieved from voxel memory forwarded to one of the pipelines. The voxels are retrieved from voxel memory in sections in a beam/slice order. Each of the pipelines buffers voxels at a voxel, beam and slice granularity to ensure that the voxel data is immediately available to the pipeline for performing interpolation or gradient estimation calculations for neighboring voxels, received at different times at the pipeline. Data are transferred between the pipelines in only one direction. The output from the pipelines comprises two-dimensional display data, which is stored in a pixel memory and transferred to an associated graphics display card either directly or through the host. Each of these steps is described in more detail below.

Sectioning a volume data set

Figure 8:
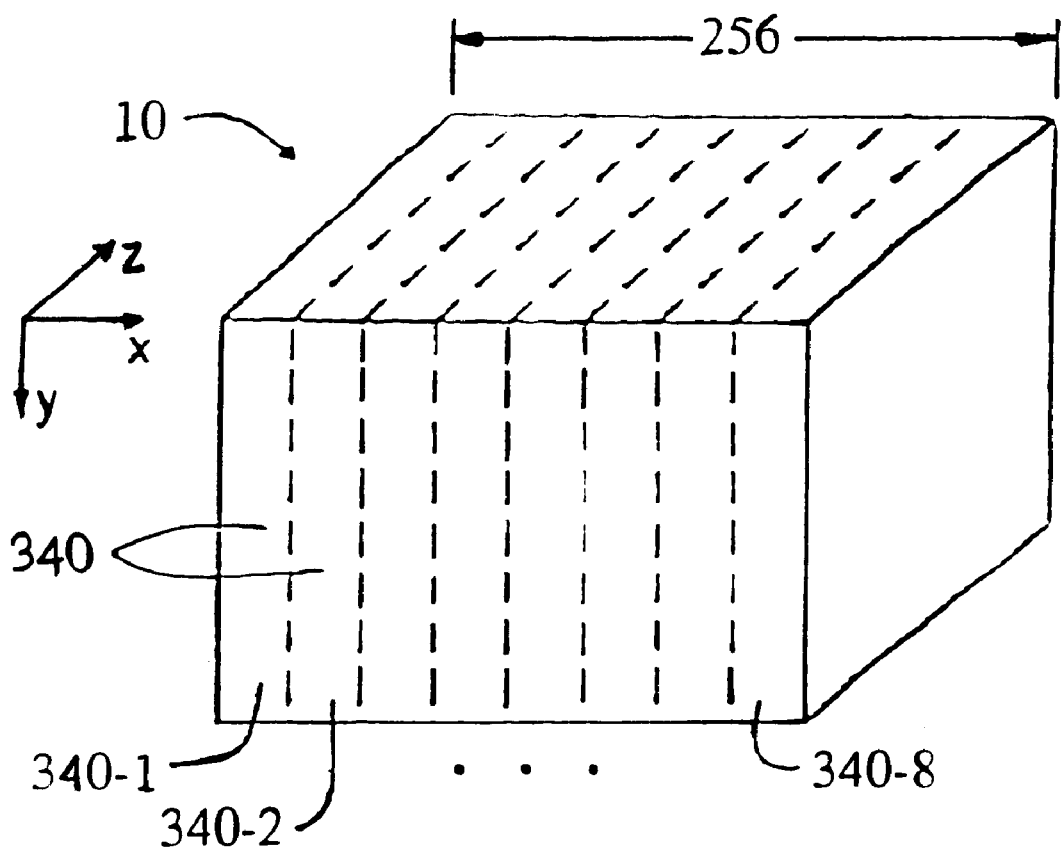
FIG. 8 illustrates how a volume data set is organized into sections.

In one embodiment, the volume data set is rendered a section at the time. FIG. 8 illustrates the manner in which the volume data set 10 is processed as sections 340 in the x direction. Each section 340 is defined by boundaries, which in the illustrated embodiment include respective pairs of boundaries in the x, y and z dimensions. In the case of the illustrated x-dimension sectioning, the top, bottom, front and rear boundaries of each section 340 coincide with corresponding boundaries of the volume data set itself. Similarly, the left boundary of the left-most section 340-1 and the right boundary of the right-most section 340-8 coincide with the left and right boundaries respectively of the volume data set 10. All the remaining section boundaries are boundaries separating sections 340 from each other.

In the illustrated embodiment, the data set 10 is 256 voxels wide in the x direction. These 256 voxels are divided into eight sections 340, each of which is thirty-two voxels wide. Each section 340 is rendered separately in order to reduce the amount of FIFO storage required within the processing element 210.

In the illustrated embodiment, the volume data set may be arbitrarily wide in the x direction provided it is partitioned into sections of fixed width. The size of the volume data set 10 in the y direction is limited by the sizes of FIFO buffers, such as buffers 106 and 114 of FIG. 5A, and the size of the volume data set 10 in the z direction is limited by the size of a section memory which is described below. However, from a practical point of view, independence of view direction limits the size of the volume in all three directions.

Transferring the Volume Data set from Host Memory to the VGB

Referring to FIG. 6, in one embodiment, the transfer of voxels between host memory 134 and voxel memory 100 is performed using Direct Memory Access (DMA) protocol. For example, voxels may be transferred between host memory 134 and voxel memory 100 via the PCI bus 208 with the VRC 202 as the bus master (DMA transfer) or bus target.

There are generally four instances in which voxels are transferred from host memory 134 to voxel memory 100 via DMA operations. First, an entire volume object in host memory 134 may be loaded as a complete volume into the voxel memory 100. Second, an entire volume object in host memory 134 may be stored as a subvolume in voxel memory 100. Third, a portion, or sub-volume of a volume object in host memory 134 may be stored as a complete object in voxel memory 100. Alternatively, a portion or subvolume of a volume object on the host memory 134 is stored as a subvolume in voxel memory.

Transferring a complete volume from host memory 134 to voxel memory 100 may be performed using a single PCI bus master transfer, with the starting location of the volume data set and the size of the volume data set specified for the transfer. To transfer a portion or subvolume of a volume data set in host memory to voxel memory, a set of PCI bus master transfers are used, because adjacent voxel beams of the host volume may not be contiguous in host memory.

A number of registers are provided in the host to control the DMA transfers between the host 130 and the VGB 140. These registers include a VX_HOST_MEM_ADDR register, for specifying the address of the origin of the volume in host memory, a VX_HOST_SIZE register for indicating the size of the volume in host memory, a VX_HOST_OFFSET register, for indicating an offset from the origin at which the origin of a subvolume is located, and a VX_SUBVOLUME_SIZE register, describing the size of the subvolume to be transferred. Registers VX_OBJECT_BASE, VX_OBJECT_SIZE, VX_OFFSET and VX_SUBVOLUME_SIZE provide a base address, size, offset from the base address and subvolume size for indicating where the object from host memory is to be loaded in voxel memory. Transfers of rendered volume data set from voxel memory to the host memory is performed using the registers described above and via DMA transfers with the host memory 134 as the target.

Storing Voxels in Voxel Memory

In one embodiment, the voxel memory 100 is organized as a set of four Synchronous Dynamic Random Access Memory modules (SDRAMs) operating in parallel. Each module can include one or more memory chips. In this embodiment, 64 Mbit SDRAMs with 16 bit wide data access may be used to provide burst mode access in a range of 125–133 MHz. Thus, the four modules provide 256 Mbits of voxel storage, sufficient to store a volume data set of 256×256×256 voxels at sixteen bits per voxel.

Figure 9:
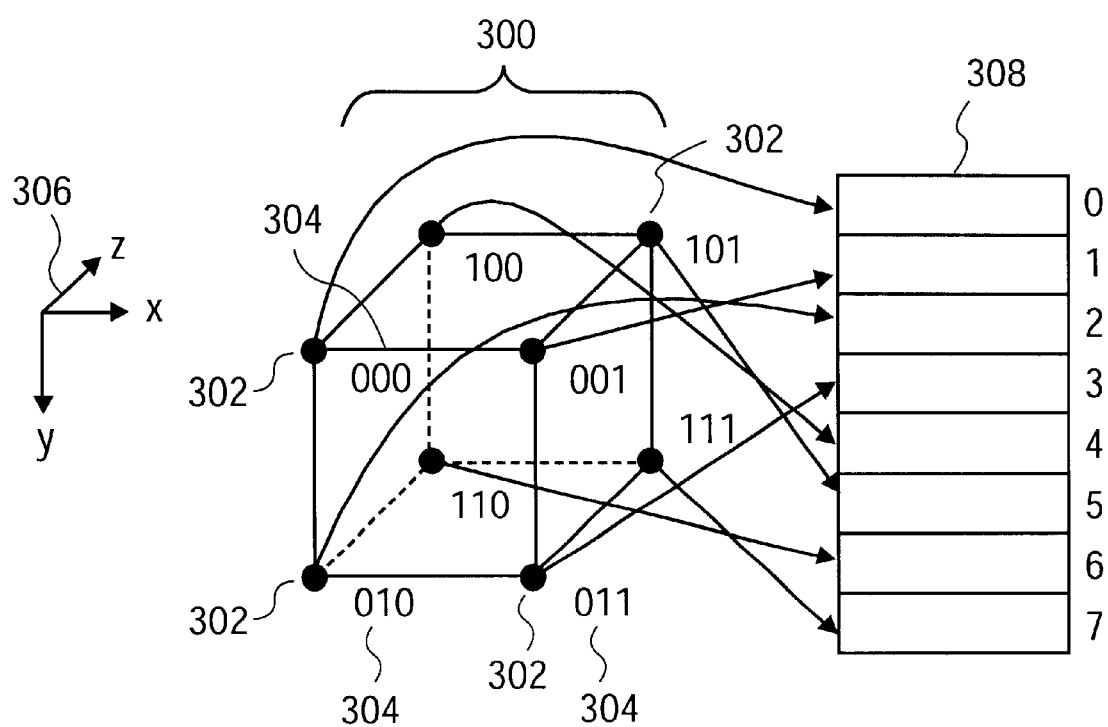
FIG. 9 is a diagrammatic representation of one method for mapping of voxels comprising a mini-block to an SDRAM in the voxel memory of FIG. 6.
Figure 10:
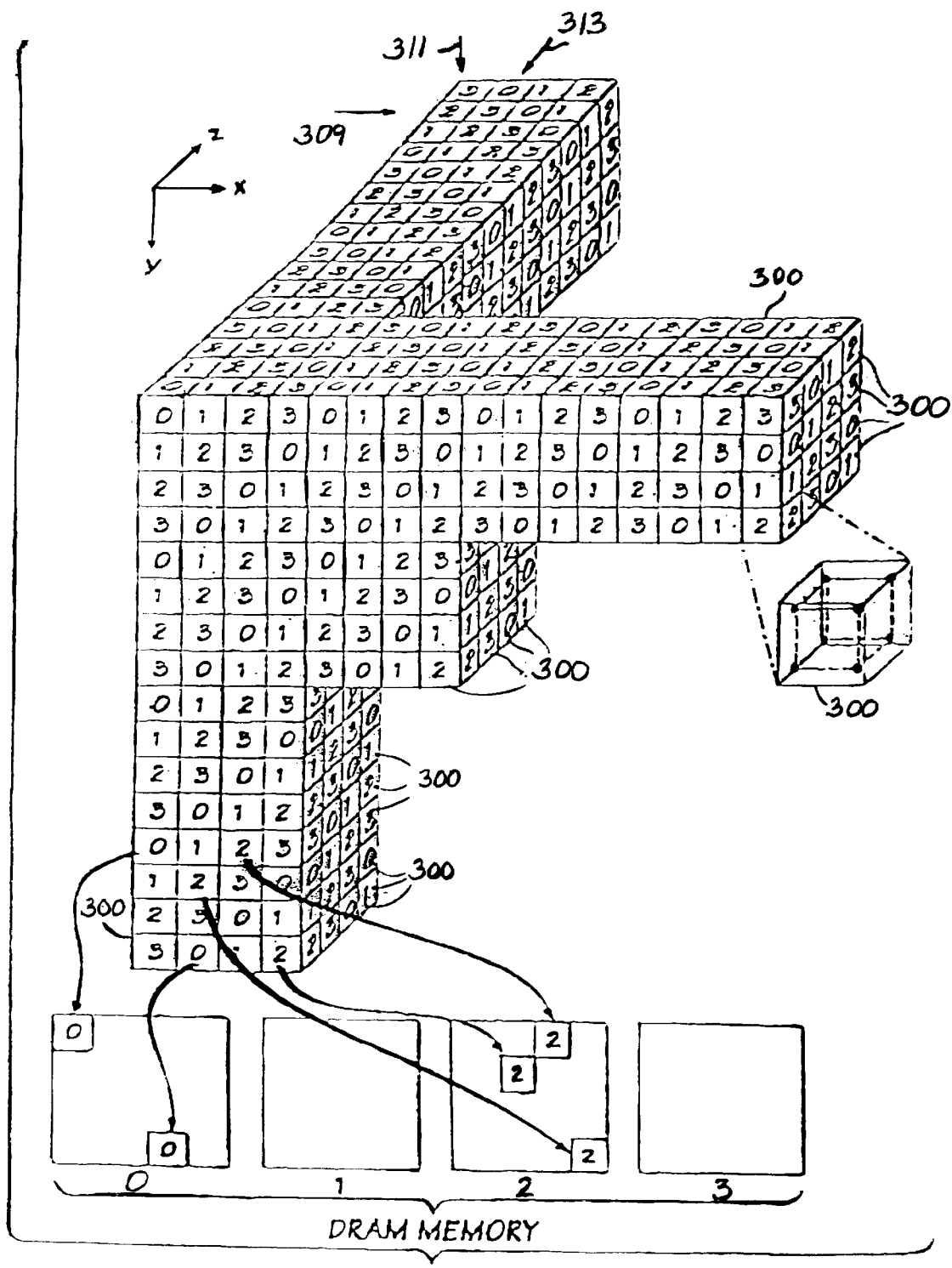
FIG. 10 illustrates one organization of mini-blocks in the voxel memory of FIG. 6, wherein consecutive mini-blocks are allocated to different SDRAMs.

Referring now to FIGS. 9 and 10, in one embodiment voxels are arranged as a cubic array of size 2×2×2, also called a "mini-block." FIG. 9 illustrates an array 300 of eight neighboring voxels 302 arranged in three-dimensional space according to the coordinate system of axes 306. The data values of the eight voxels 302 are stored in an eight-element array 308 in voxel memory. Each voxel occupies a position in three-dimensional space denoted by coordinates (x, y, z), where x, y, and z are all integers.

The index of a voxel data value within the memory array of its mini-block is determined from the lower order bit of each of the x, y, and z coordinates. As illustrated in FIG. 9, these three low-order bits are concatenated to form a three-bit binary number 304 ranging in value from zero to seven, which is then utilized to identify the array element corresponding that that voxel. In other words, the array index within a mini-block of the data value of a voxel at coordinates (x, y, z) is given by Equation II below:

Equation II:

$$(x \bmod 2) + 2 \times (y \bmod 2) + 4 \times (z \bmod 2).$$

Just as the position of each voxel or sample can be represented in three dimensional space by coordinates (x, y, z), so can the position of a mini-block be represented in mini-block coordinates $(x_{mb}, y_{mb}, z_{mb})$. In these coordinates, $X_{mb}$ represents the position of the mini-block along the x axis, counting in units of whole mini-blocks. Similarly, $Y_{mb}$ and $Z_{mb}$ represent the position of the mini-block along the y and z axes, respectively, counting in whole mini-blocks. Using this notation of mini-block coordinates, the position of the mini-block containing a voxel with coordinates (x, y, z) is given by Equation III below:

Equation III:

$$X_{mb} = \left\lfloor \frac{X}{2} \right\rfloor, \quad Y_{mb} = \left\lfloor \frac{Y}{2} \right\rfloor, \quad Z_{mb} = \left\lfloor \frac{Z}{2} \right\rfloor.$$

Referring now to FIG. 10, one method of arranging mini-blocks in voxel memory is provided wherein the mini-blocks are "skewed" across DRAMs in voxel memory to take advantage of "burst" mode capabilities of the SDRAMs. Burst mode allows one to access a small number of successive locations at full memory speed. This embodiment, described in more detail in U.S. patent application Ser. No. 09/191,865 entitled "Two-Level Mini-block Storage System for Volume Data sets", filed Nov. 12, 1998 incorporated herein by reference.

In FIG. 10, a partial view of a three-dimensional array of mini-blocks 200 is illustrated, each mini-block being depicted by a small cube labeled with a numeral. The numeral represent the assignment of that mini-block to a particular DRAM chip. In the illustrated embodiment, there are four different DRAM chips labeled 0, 1, 2, and 3. It will be appreciated from the figure that each group of four adjacent mini-blocks aligned with an axis contains one mini-block with each of the four labels. That is, starting with any mini-block at coordinates $(x_{mb}, y_{mb}, z_{mb})$ and sequencing through the mini-blocks in the direction of the x axis, the SDRAMS 0, 1, 2 and 3 can be concurrently accessed. Likewise, by sequencing through the mini-blocks parallel to the y or z axis, SDRAMS 0,1,2 and 3 can be concurrently accessed. Therefore, it will be appreciated that when traversing the three-dimensional array of mini-blocks in any direction 309, 311, or 313 parallel to any of the three axes, groups of four adjacent mini-blocks can always be fetched in parallel from the four independent memory of the SDRAM chips.

In modern DRAM chips, it is possible to read data from or write data to the DRAM chip in bursts of modest size at the clock rate for the type of SDRAM. Typical clock rates for so-called Synchronous DRAM or "SDRAM" chips include 133 MHz, 147 MHz, and 166 MHz, corresponding 7.5 nanoseconds, 7 nanoseconds, and 6 nanoseconds per cycle, respectively. Typical burst sizes needed to sustain the clock rate are five to eight memory elements of sixteen bits each. Other types of SDRAM have clock rates up to 800 MHz and typical burst sizes of sixteen data elements of sixteen bits each. In these modern SDRAM chips, consecutive bursts can accommodated without intervening idle cycles, provided that they are from independent memory banks within the SDRAM chip. That is, groups of consecutively addressed data elements are stored in different or non-conflicting memory banks of a DRAM chip, then they can be read or written in rapid succession, without any intervening idle cycles, at the maximum rated speed of the DRAM.

Figure 11:
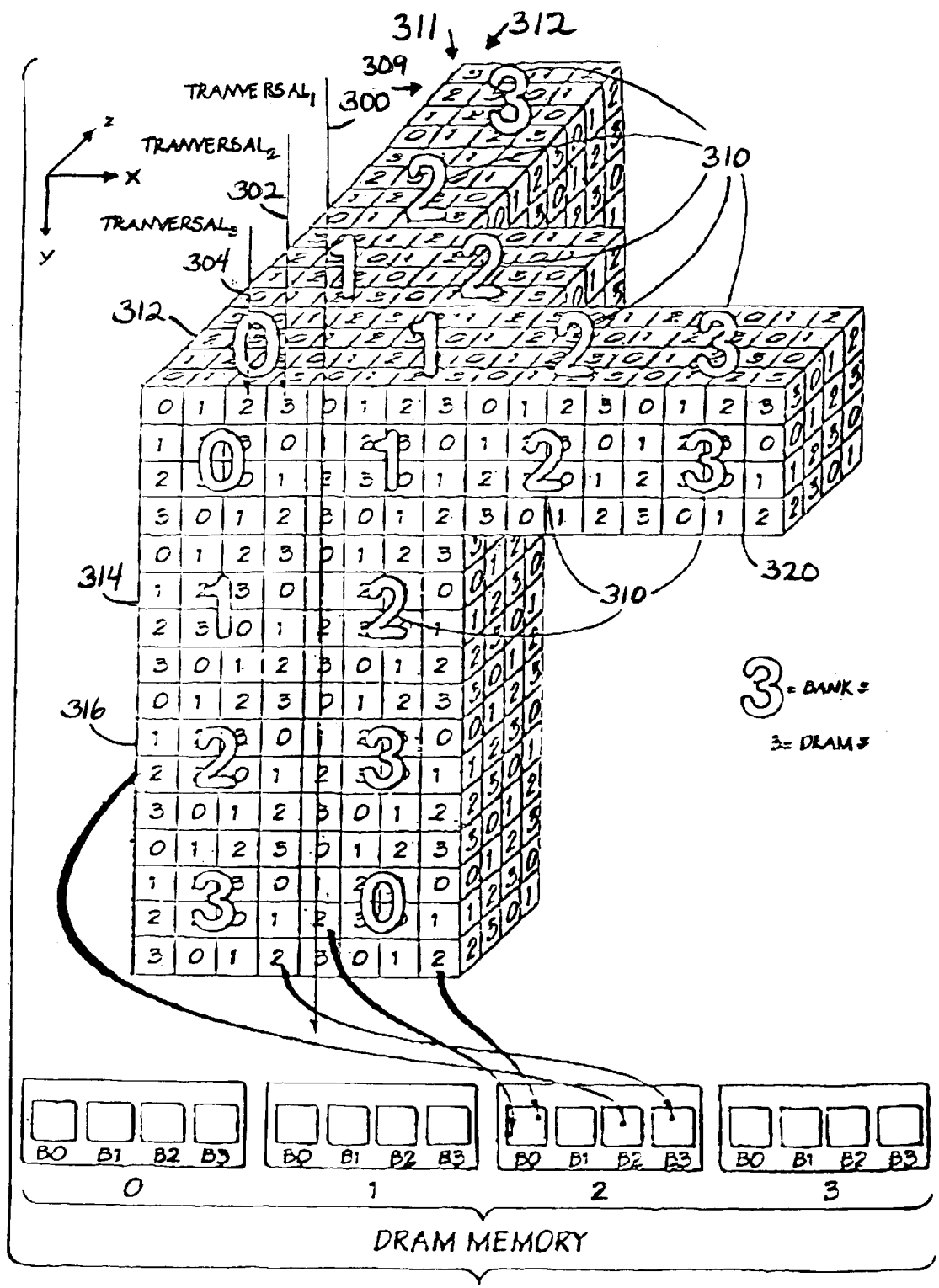
FIG. 11 illustrates a second organization of mini-blocks in the voxel memory of FIG. 6, wherein consecutive mini-blocks are allocated to different banks of different SDRAMs.

In FIG. 11, a second method of arranging min-blocks in voxel memory is shown, wherein mini-blocks are further arranged in groups corresponding to banks of the SDRAMs. Each 4×4×4 group of 2×2'2 mini-blocks is labeled with a large numeral. Each numeral depicts the assignment of each mini-block of that group to the bank with the same numeral in its assigned DRAM chip. For example, the group of mini-blocks 312 in the figure is labeled with numeral 0. This means that each mini-block within group 312 is stored in bank 0 of its respective memory chip. Likewise, all of the mini-blocks of group 314 are stored in bank 1 of their respective memory chips, and all of the mini-blocks of group 316 are stored in bank 2 of their respective memory chips.

It will be appreciated from the figure that when a set of pipelined processing elements traverses the volume data set in any given orthogonal direction, reading four mini-blocks at a time in groups parallel to any axis, adjacent groups, such as Group 0 and Group 1, are always in different banks. This means that groups of four mini-blocks can be fetched in rapid succession, taking advantage of the "burst mode" access of the DRAM chips, and without intervening idle cycles on the part of the DRAM chips, for traversal along any axis. This maximizes the efficiency of the DRAM bandwidth.

Retrieving voxels from voxel memory

As described above with regard to FIGS. 10 and 11, sequential mini-blocks are allocated to different ones of the SDRAMs, and to different banks within the SDRAMs. By arranging the voxel data in this manner, the performance of the SDRAM device may be more fully utilized. However, before processing of the rendering data may begin, the order of voxels must be restored so that adjacent voxels of the volume data set are processed by adjacent pipelines of the VGB. This enables pipelines to communicate with only one immediate neighboring pipeline.

Figure 12:
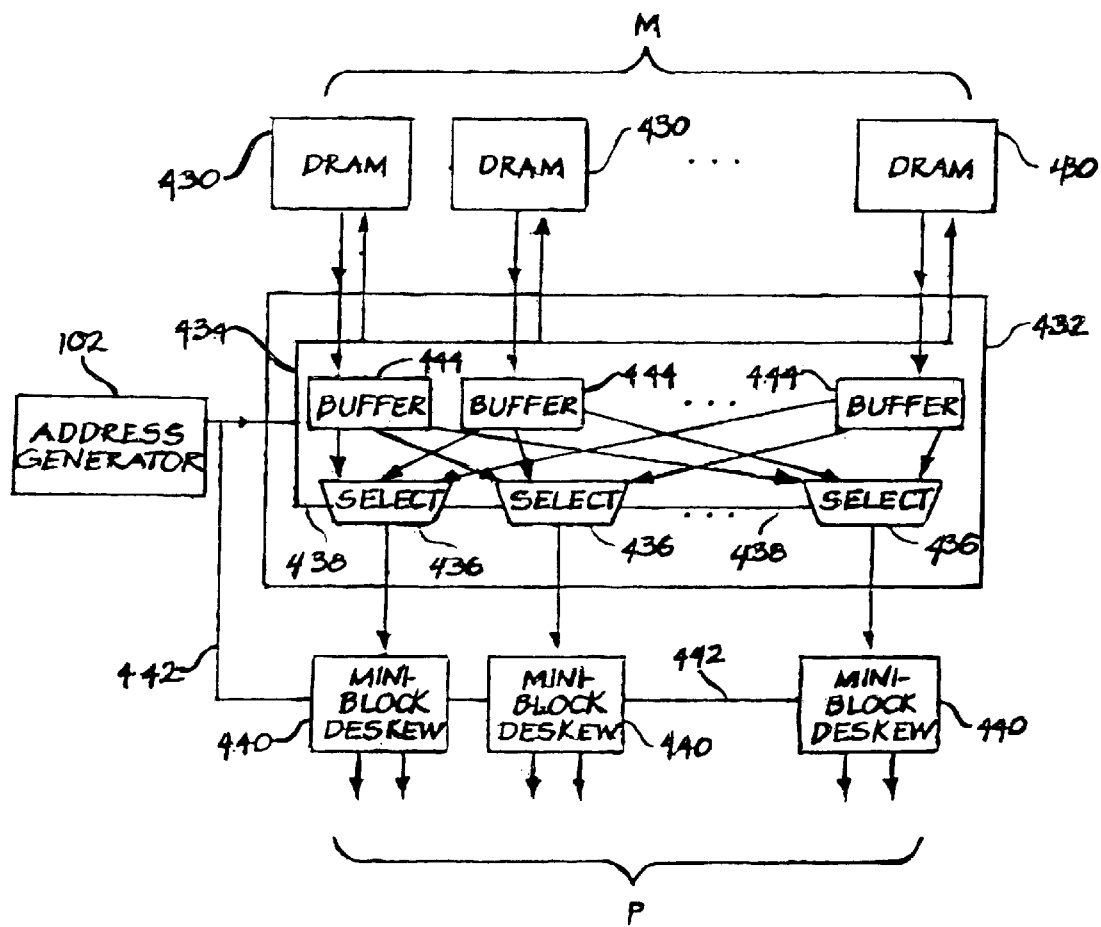
FIG. 12 illustrates one organization of a render controller in the integrated circuit of FIG. 7 including an apparatus for reading voxels from any of the SDRAM locations of voxel memory.

Referring now to FIG. 12, a de-skewing network is shown for rearranging the voxel data values of a group of M mini-blocks to present them in the correct traversal order to the parallel processing pipelines of the volume rendering system. At the top of FIG. 12, M independent DRAM chips 430 comprise the Voxel Memory 100 of FIG. 6. Mini-blocks are read concurrently from these M chips under the control of Address Generator 102, which generates memory addresses 434 of mini-blocks in the order of traversal of the volume data set. The memory input from DRAM chips 430 is coupled to a set of Selection units 436 which also operate under the control of the Address Generator 102 via Selection signal 438. As M mini-blocks are read from their corresponding memory modules 430, Selection units 436 effectively rearrange or permute them so that their alignment from left to right corresponds to the physical position of the mini-blocks in the volume data set, regardless of which memory modules they came from. That is, each Selection unit 436 selects its input from at most one of the DRAM chips, and each DRAM chip 430 is selected by at most one Selection unit.

The outputs of the Selection units 436 are then coupled to Mini-block De-skewing units 440. Operating under the control of Address Generator 102 via signal line 442, each Mini-block De-skewing unit rearranges the data values within its mini-block so that they are presented in an order corresponding to the physical position of each voxel relative to the order of traversal, e.g. their natural order. A total of P streams of voxel values are output from the Mini-block De-skewing units and coupled to the Interpolation units 103 of P pipelines of the type illustrated in FIG. 5A. It will be appreciated that the number of memory chips M may be less than, the same as, or greater than the number of processing pipelines P. It should also be noted that the deskewer circuit 440 may be placed between the DRAM modules 420 the deskewing network 432.

By the means shown above, it is possible to read data from voxel memory at a sustained rate of one voxel data value per cycle from any view direction, with no delays due to memory or bank conflicts, but with one exception. The exception, is when the bank at the end of one beam is the same as the bank at the start of another beam. This occurs only in a limited number of cases. However, if this exception were not recognized, then there would be a delay of several cycles at the ends of the offending beams while each DRAM chip pre-charges its bank in order to read a second consecutive mini-block from the same bank. This delay would propagate through the entire pipeline of FIG. 5A, necessitating extra control circuitry and complexity. To alleviate this problem, extra buffers 444 are introduced between DRAM chips 430 and Selection units 436, as illustrated in FIG. 12. Each buffer is large enough to accommodate as many mini-blocks as will be read in a beam of mini-blocks. Reading of the offending beams progresses from left-to-right, instead of right-to-left.

Traversal of Voxel Memory

Figure 13:
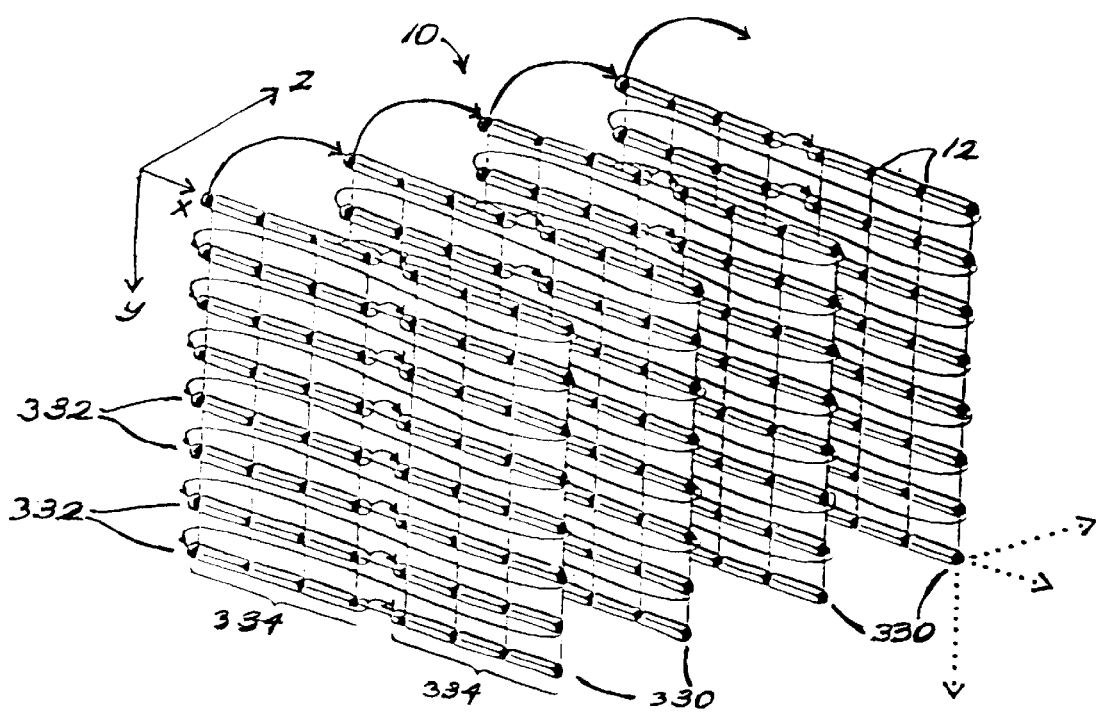
FIG. 13 is a schematic representation of a retrieval order of voxels from voxel memory.

Referring now to FIG. 13, as described above with reference to FIG. 8, the volume data set 10 is divided into parallel "slices" 330 in the z direction (which as described above is the axis most nearly parallel to the view direction). Each slice 330 is divided into "beams" 332 in the y direction, and each beam 332 consists of a beam of voxels 12 in the x direction. The voxels 12 within a beam 332 are divided into groups 334 of voxels 12 which as described above are processed in parallel by the four rendering pipelines 212. In one embodiment, the groups of voxels are arranged as 2×2×2 mini-blocks.

In the illustrative example, the groups 334 consist of four voxels along a line in the x dimension. The groups 334 are processed in left-to-right order within a beam 332; beams 332 are processed in top-to-bottom order within a slice 330; and slices 330 are processed in order front-to-back. This order of processing corresponds to a three-dimensional scan of the data set 10 in the x, y, and z directions. It will be appreciated that the location of the origin and the directions of the x, y and z axes can be different for different view directions.

Although in FIG. 13 the groups 334 are illustrated as linear arrays parallel to the x axis, in other embodiments the groups 334 may be linear arrays parallel to another axis, or rectangular arrays aligned with any two axes, or rectangular parallelepipeds. Beams 332 and slices 330 in such other embodiments have correspondingly different thicknesses. For example, in an embodiment in which each group 334 is a 2×2×2 rectangular mini-block, the beams 332 are two voxels thick in both the y and z dimensions, and the slices 330 are 2 voxels thick in the z dimension. The method of processing the volume data set described herein also applies to such groupings of voxels.

Pipelined Parallel Processing of the Voxels

Figure 14:
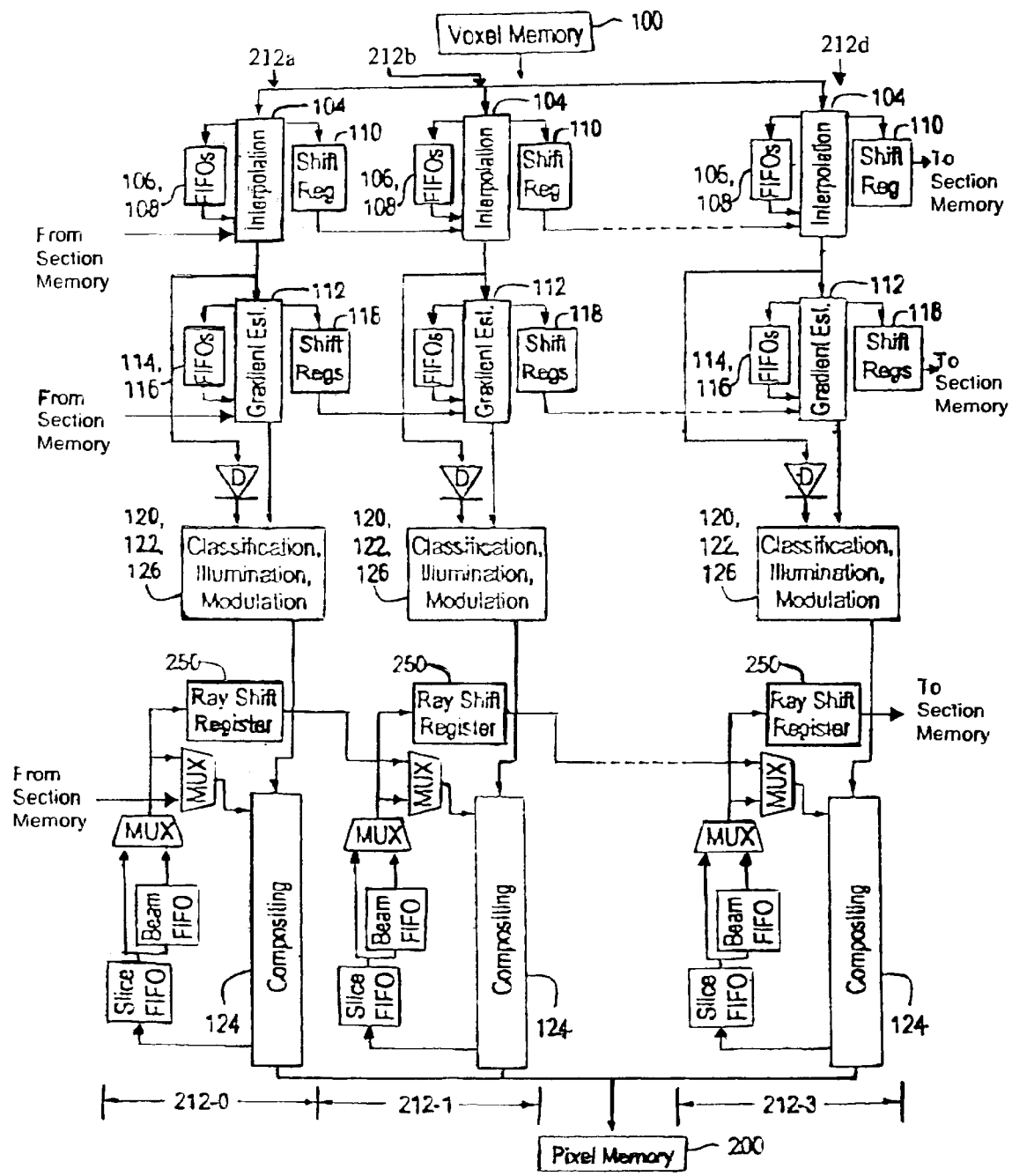
FIG. 14 is a block diagram of the volume rendering integrated circuit of FIG. 7 showing parallel processing pipelines such as those of FIGS. 5A and 5B.

FIG. 14 shows the processing element 210 of FIG. 7, including four processing pipelines 212 such as those described for FIGS. 5A and 5B. The pipelines operate in parallel. Parallel pipelines 212 receive voxels from voxel memory 100 and provide accumulated rays to pixel memory 200. For clarity only three pipelines 212-0, 212-1 and 212-3 are shown in FIG. 14. As described previously for FIGS. 5A and 5B, each pipeline 212 includes an interpolation unit 104, a gradient estimation unit 112, a classification unit 120, an illumination unit 122, modulation units 126 and a compositing unit 124, along with associated delay buffers and shift registers.

Each pipeline processes adjacent voxel of sample values in the x direction. That is, each pipeline processes all voxels 12 whose x coordinate value modulo 4 is a given value between 0 and 3. Thus for example pipeline 212-0 processes voxels at positions (0,y,z), (4,y,z), ..., (252,y,z) for all y and z between 0 and 255. Similarly, pipeline 212-1 processes voxels at positions (1,y,z), (5,y,z), ..., (253,y,z) for all y and z, etc.

In order to time-align values needed for calculations, each operational unit or stage of each pipeline passes intermediate values to itself in the y and z dimensions via the associated FIFO delay-buffers. For example, each interpolation unit 104 retrieves voxels at positions (x,y,z) and (x,y+1,z) in order to calculate the y component of an interpolated sample at position (x,y',z) where y' is between y and y+1. The voxel at position (x,y,z) is delayed by a beam FIFO 108 (see FIG. 5) in order to become time-aligned with the voxel at position (x,y+1,z) for this calculation. An analogous delay can be used in the z direction in order to calculate z components, and similar delays are also used by the gradient units 112 and compositing units 124.

It is also necessary to pass intermediate values for calculations in the x direction. Therefore, like stages in the parallel pipelines are connected in a ring. The intermediate values are transferred out of one pipeline to an immediate neighboring pipeline. Each pipeline (such as pipeline 212-1) is coupled to its neighboring pipelines (i.e., pipelines 212-0 and 212-2) by means of shift registers in each of the four processing stages (interpolation, gradient estimation, classification and compositing). The shift registers may be used to pass processed values from a stage in one pipeline to the corresponding stage in the neighboring pipeline. The shift registers couple the stages in a ring-like manner.

Each shift register couples only immediate adjacent stages of neighboring pipelines such that a one-way ring is formed of such like stages. Forming such rings allows the pipelines to process data in a synchronous manner. The right-most pipeline couples to the left-most pipeline, via the section memory, with a delay of one cycle, so that associated data in the x-direction is time aligned.

In one embodiment, the final pipeline, pipeline 212-3, transfers data from shift registers 110, 118 and 250 to the section memory 204 for storage.

This data is later retrieved from section memory 204 for use by the first pipeline stage 212-0. In essence, voxel and sample values are circulated, in a ring-like manner among the stages of the pipelines and section memory so that the values needed for processing are available at the respective pipeline at the appropriate time during voxel and sample processing.

As an example, the interpolation unit 104 in pipeline 212-0 calculates intermediate values during the calculation of a sample at position (x,y,z). Some of the intermediate values are also used for calculating a sample at position (x+1,y,z), which is performed by the interpolation unit 104 in the neighboring pipeline 212-1. The intermediate values are passed from the interpolation unit 104 in pipeline 212-0 to the interpolation unit 104 in pipeline 212-1 via an associated shift register 110.

In one embodiment, section memory 204 is arranged in a double buffer configuration that allows data to be written into one buffer while other data is read out of the second buffer. The double buffering aspect of the section memory 204 is used during processing to allow the shift registers 110, 118 and 250 to write data into section memory 204 while the interpolation unit 104, gradient estimation unit 112 and compositing unit 124 retrieve data from section memory.

Thus, data may be transferred from pipeline 212-3 to pipeline 212-0 with a delay of only one cycle or one unit of time. This configuration enables the processing element 210 to step across the volume data set 10 in groups of 4 voxels. For example, intermediate values calculated for positions (3,y,z) are passed to the left-most pipeline 212-0 to be used for calculations for positions (4,y,z) in the next cycle. Likewise, intermediate values calculated for positions (7,y,z), (11,y,z), etc. are passed to the left-most pipeline 212-0 to be used for calculations for, positions (4,y,z), (12,y,z), etc. in respective next cycles.

Rendering Control

The various rendering processing steps described above with regard to FIGS. 8–14 are controlled by a combination of the VGB driver 136 of FIG. 6 and hardware the volume rendering chip VRC 202. A companion 3-D graphics card and its associated driver may be provided with the host computer to control the display of rendered data sets on two-dimensional display device such as a computer monitor.

Figure 15:
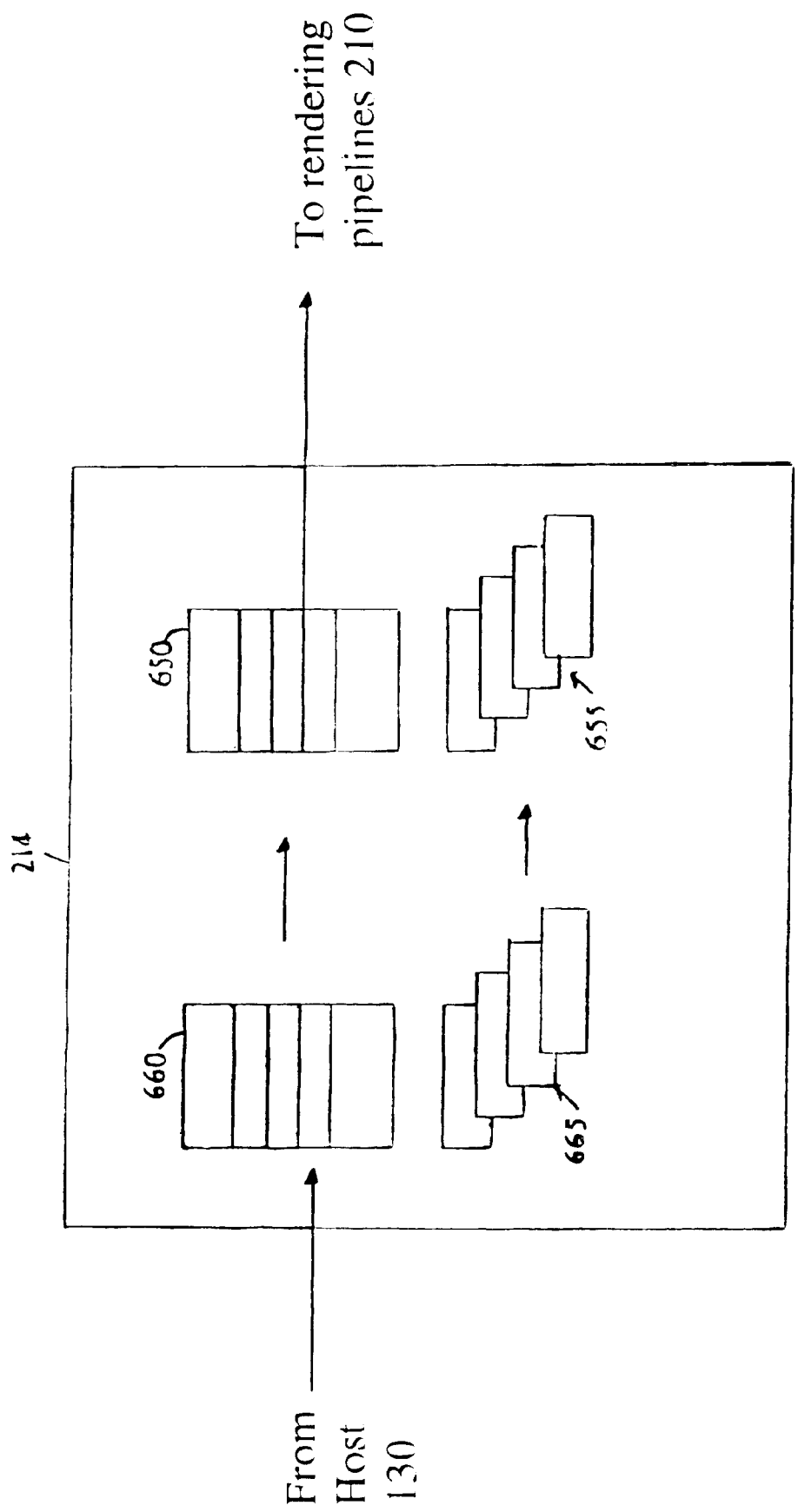
FIG. 15 is a block diagram of some components of a render controller that may be used to control the parallel processing pipelines of FIG. 14.

In particular, the VGB driver controls the VRC 202 by writing certain registers and look-up tables in the render controller 214 of the VRC 202. One embodiment of the render controller 214 is shown in FIG. 15 to include two sets of registers 650 and 660 and look-up tables 655 and 665. At any given time during the rendering process, register/lookup table pair 650/655 is active while register/lookup table pair 660/665 is pending. The active pair is used during the rendering of one frame by rendering pipelines 210 (FIG. 7) while the pending pair is updated by the host 130 to prepare the VRC for rendering a next frame in the sequence of frames. Double-buffering the control registers in this manner enables a new frame to be rendered every cycle as will be described below.

In one embodiment, the registers 650 and 660 include those registers shown in FIG. 16. The registers are apportioned into three classes of registers; a rendering command register for controlling the specific operation to be performed by the VRC 652, object parameter registers 654 for describing the object to be rendered and cut plane parameter registers 656 for identifying the cut plane to be used for rendering. The rendering command register 652 may be encoded to perform the following functions: render object, transfer pixel buffer (for transferring the pixel buffer to host memory when the render object command has completed), clear pixel buffer (prior to rendering an object), exclude edge x, y or z samples (from being used in a composite), reload tables (either diffuse, specular, alpha or color), blend (front to back), and disable gradient magnitude illumination, among others. The present invention is not limited to the provision of any specific command or parameter registers.

The look-up tables 655 and 665 in render controller 214 may include diffuse and specular reflectance maps, alpha tables and color tables. Alternative lookup tables may also be provided and the present invention is not limited to the use of any particular lookup table.

Figure 17:
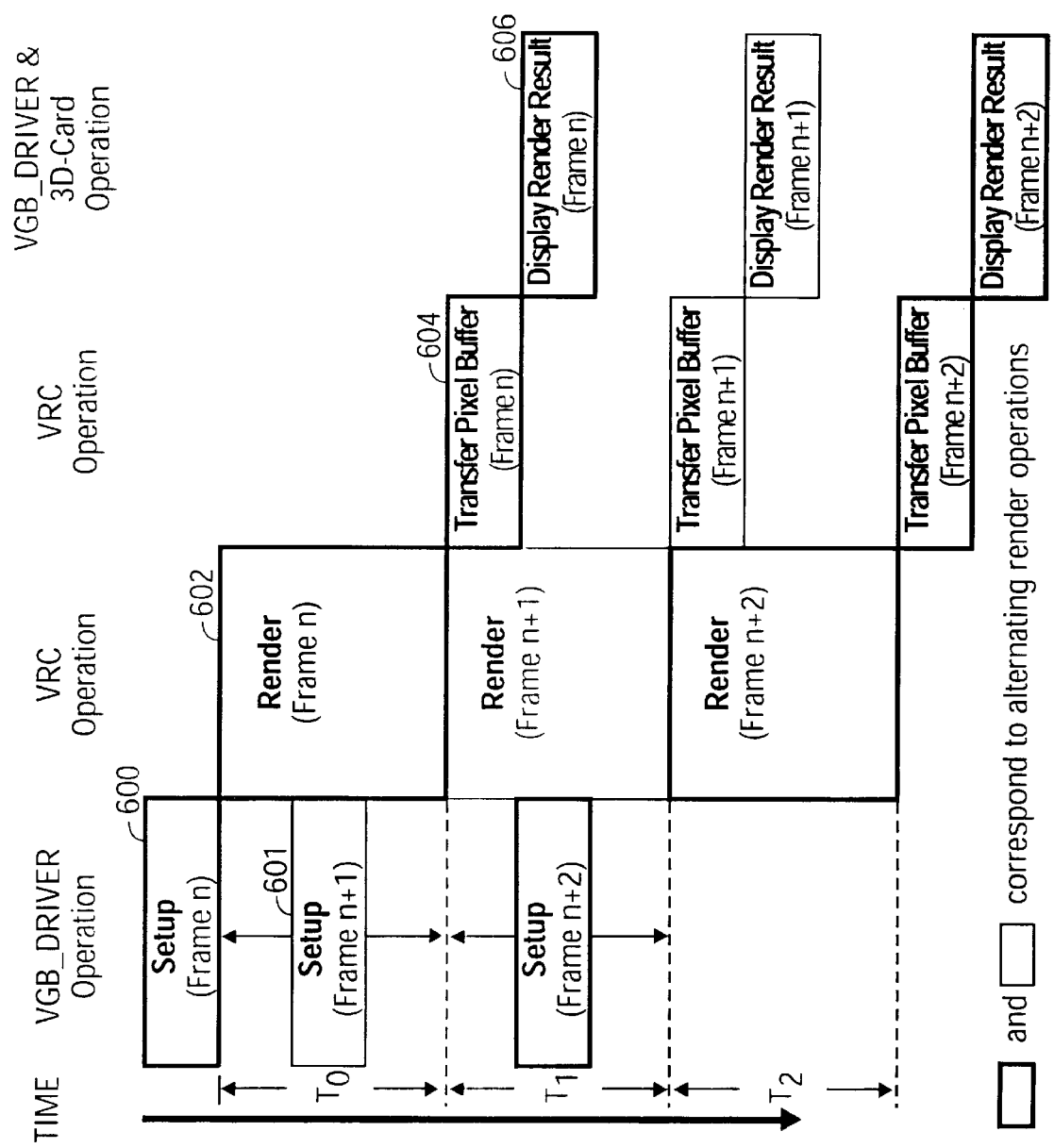
FIG. 17 is a flow diagram illustrating a process for rendering a volumetric data set in the volume rendering system of FIG. 6.

The steps used to render an object on a two-dimensional display device are illustrated in FIG. 17. In FIG. 17, time is displayed as periods along the y-axis, increasing from period $T_0$ to period $T_2$, where each period is has a duration equal to the time allocated for rendering one frame. Accordingly, in a system capable of rendering 30 frames/sec, each time interval represents $\frac{1}{30}^{th}$ of a second. The functions that each of the components are performing at any given time interval are represented along the x-axis. Thus, prior to period T0, at step 600, the VGB driver 136 writes rendering parameters for frame n, indicating the object to be rendered, and issues the render command by writing a Render Command Register (RENDER_COMMAND) in render controller 214 of the VRC 202 (FIG. 7). In response to the receipt of the render command at the VRC, the VRC clears the Pixel Buffer to the value specified in a BACKGROUND_COLOR parameter in preparation for the rendering frame n. In addition, the VRC transfers the parameters from the pending register lookup table pair 660/665 to the active register/lookup table pair 650/655.

During period To, at step 602, the VRC 202 renders the object according to the parameters established in the. setup phase. The VRC 202 writes the results of the render operation to the Pixel Buffer in pixel memory 200. Once the pending parameter set is loaded in the active parameter set the VRC 202 signals the VGB_DRIVER 136 with a Pending Empty condition indicating that the new parameters can be loaded.

At step 601, while the VRC 202 renders frame n the VGB_DRIVER 136 prepares for the rendering of frame n+1 by writing the render parameters into the pending parameter set and writing the Render Command Register (RENDER_COMMAND) with the next render command. In response, the VRC clears the Pixel Buffer to the value specified in the BACKGROUND_COLOR parameter in preparation for the rendering frame n+1 and transfers the pending parameter set to the active parameter set in preparation for rendering frame n+1.

At step 604 during period $T_1$, the VRC 202 transfers the Pixel Buffer containing the rendered results for frame n to host memory 136 or texture memory of the Companion 3D Graphics Card. During this period, the VRC 202 renders frame n+1 and at step 606 the VGB_DRIVER 136 commands the companion 3-D graphics card to warp and display the rendered image on the two-dimensional display device.

By pipelining the operations of the VGB driver 136, VRC 202 and graphics card, a different rendered frame may be displayed at real-time frame rates. While the VRC 202 renders the current frame the VGB_DRIVER 136 prepares the VRC for rendering of the next frame. In one embodiment, to allow for this overlap the rendering controller 214 (FIG. 7) of the VRC 202 includes two sets of rendering parameter registers and tables, one set (active parameters) is used for the active frame and the other set (pending parameters) is used for setting up the next render operation. Once the current rendering operation is complete the pending parameter set is transferred to the active parameter set and the next rendering operation begins. Only the pending parameter set is accessible by software.

The operation of transferring the pending set to the active set does not destroy the contents of the pending set, so incremental changes the rendering parameters and look-up tables can be made. The Setup operation for frame n+1 can happen any time during the rendering of frame n, although it is desirable to perform the setup as soon as possible such that the parameters will be stable for reading by the VRC in the next period.

A volume rendering architecture enabling real-time interactive rendering rates has been described. Components of the architecture that enhance the performance of volume rendering architecture include data sets apportioned into sections, thereby allowing smaller portions of the volume data set to be rendered at a time. By rendering smaller data sets, the overall storage required on the volume graphics board may be reduced. In addition, volume data sets are stored in voxel memory as mini-blocks, which are stored in a skewed arrangement to allow the full burst-mode capabilities of the voxel memory devices utilized.

A volume rendering integrated circuit includes multiple pipelines within the chip. Data from any one of the voxel memory devices may be forwarded to any one of the processing pipelines, thereby enhancing the data throughput between voxel memory and the integrated circuit. Data is transferred between the pipelines in only one direction, thereby reducing the storage requirements associated with each pipeline and further reducing routing and interface logic associated with prior art arrangements. Reducing the storage and routing associated with each pipeline facilitates the implementation of the multi-pipeline rendering system on one integrated circuit.

A software interface pipelines rendering tasks performed by a host computer, graphics rendering board and 3-D graphics display thereby allowing volumetric data to be rendered in real-time. By double-buffering the control registers and look-up tables that control the VRC, any changes that are made to the volumetric data may be viewed instantly. As a result, interactive manipulation of the volumetric data may be achieved.

Having described various embodiments of the present invention, it should be understood that other embodiments and variations consistent with the present invention will be apparent to those skilled in the art. Therefore, the invention should not be viewed as limited to the disclosed embodiments but rather should be viewed as limited only by the spirit and scope of the appended claims.

We claim:

1. An apparatus for rendering a volume data set arranged as a three-dimensional array of voxels, comprising:
    a plurality of rendering pipelines;
    means for coupling the plurality of pipelines in a ring; and
    means for forwarding data from each one of the plurality of pipelines to only one other neighboring pipeline in the ring via the means for coupling.

2. The apparatus according to claim 1, wherein each pipeline is coupled to the volume data set to receive one voxel from the three dimensional array of voxels for processing in one processing cycle.

3. The apparatus according to claim 1, wherein the plurality of pipelines are implemented within a single integrated semiconductor circuit.

4. The apparatus according to claim 1, further comprising:
    a storage device interface, coupled between a first and last one of the plurality of pipelines in the ring, for transferring data from the last one of the plurality of pipelines in the ring to a coupled storage device, the storage device interface also for transferring data from the coupled storage device to the first one of the plurality of pipelines in the ring.

5. The apparatus according to claim 2, wherein each one of the plurality of pipelines further comprises:
    a plurality of processing stages, each processing stage to receive information associated with the one voxel and to provide rendering data for the one voxel in the processing cycle; and
    a plurality of delay buffers, each delay buffer coupled to only one processing stage, the delay buffer for delaying the information received in the processing cycle for a predetermined number of processing cycles.

6. The apparatus according to claim 5 further comprising:
    an interpolation stage for interpolating values of neighboring voxels in the volume data set to provide sample data;
    a gradient estimation stage coupled to derive a rate of change of sample data received from the interpolation stage to provide gradient data;
    a classification stage coupled to assign color and opacity values to the sample data;
    an illumination stage coupled to modify the color and opacity values in response to lighting information and the gradient data; and
    a compositing unit coupled to combine the modified color and opacity values to provide a pixel value for display on an output device.

7. The apparatus according to claim 6 further comprising:
    a section memory coupled to the plurality of pipelines to store a section of voxels of the volume data set.

8. The apparatus according to claim 6 further comprising:
    a host interface to couple the plurality of pipelines to a host computer.

9. The apparatus according to claim 1, further comprising:
    a render controller, coupled to the plurality of pipelines, for controlling the transfer of data between a coupled volume storage device and the plurality of pipelines.

10. A volume graphics integrated circuit comprising:
    a plurality of pipelines;
    a host interface for coupling the plurality of pipelines to a host device;
    a memory interface for coupling the plurality of pipelines to a first storage device, the first storage device for storing a volume data set;
    a pixel interface, for coupling the plurality of pipelines to a second storage device, the second storage device for storing pixel data representative of one view of the volume data set stored in the first storage device; and
    a section interface, for coupling the plurality of pipelines to a third storage device, the third storage device for storing rendering data associated with at least a section of the volume data set.

11. The volume graphics integrated circuit according to claim 10 further comprising a command sequencer, disposed between the host interface and the memory interface, for transferring commands to the plurality of pipelines and for transferring the volume data set to the memory interface.

12. The volume graphics integrated circuit according to claim 11, further comprising a render controller, coupled to the plurality of pipelines, the host interface, the memory interface, the pixel interface and the section interface, for controlling rendering operations performed by the plurality of pipelines.

13. The volume graphics integrated circuit according to claim 12, wherein the render controller further controls the transfer of data between the plurality of pipelines and the host, memory, pixel and section interfaces.

14. The volume graphics integrated circuit according to claim 10 wherein the volume data set includes a plurality of voxels, and wherein each of the plurality of pipelines further comprises:

at least one processing stage, the processing stage to receive information associated with one voxel and to provide rendering data for the one voxel in a processing cycle; and a delay buffer, coupled to an input and an output of the at least one processing stage, to store the information received in the processing cycle, the delay buffer comprising a number of entries and wherein the number of entries of the delay buffer is selected to delay the output of the information by the delay buffer for a number of processing cycles between the processing of the information associated with the one voxel and processing of information associated with a voxel neighboring the one voxel.

15. The volume graphics device according to claim 14, wherein the at least one processing stage of one of the plurality of pipelines is coupled to the at least one processing stage of only one neighboring pipeline by the delay buffer.

16. An integrated circuit for rendering a volume data set, comprising:

a plurality of identical processing pipelines operating in parallel on the volume data set, each pipeline including a plurality of different stages; and storage means connecting each stage of a particular pipeline to a corresponding stage in a neighboring pipeline.

17. The integrated circuit of claim 16 wherein the input to the plurality of pipelines is the volume data set and the output is a pixel data set for an output display device.

18. The integrated circuit of claim 16 wherein the volume data set includes a plurality of voxels and each of the plurality of pipelines processes one voxel in each clock cycle of the pipeline.

19. The integrated circuit of claim 16 wherein the storage means includes shift registers.

20. The integrated circuit of claim 16 wherein the stages include interpolation, gradient estimation, classification, illumination, modulation, and composing stages.

21. An integrated circuit, for rendering a volume data set, comprising:

a plurality of identical pipelines, each pipeline including a plurality of different stages;

a plurality of first buffers, each first buffer coupled to a particular stage, the first buffer storing results produced by the particular stage, the results to be combined with later produced results of the particular stage.

22. The integrated circuit of claim 21 further comprising:

a plurality of second buffers, each second buffer coupling a particular stage to a corresponding stage in an adjacent pipeline, the second buffer storing results produced by the particular stage, the results to be combined with results produced by the corresponding stage of the adjacent pipeline.

* * * * *